US007627181B2

(12) United States Patent
Tamura et al.

(10) Patent No.: US 7,627,181 B2
(45) Date of Patent: Dec. 1, 2009

(54) IMAGE ENCODING APPARATUS AND METHOD, COMPUTER PROGRAM, AND COMPUTER-READABLE STORAGE MEDIUM

(75) Inventors: Hirokazu Tamura, Tokyo (JP); Naoki Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 793 days.

(21) Appl. No.: 11/220,536

(22) Filed: Sep. 8, 2005

(65) Prior Publication Data

US 2006/0050974 A1 Mar. 9, 2006

(30) Foreign Application Priority Data

Sep. 8, 2004 (JP) ............................. 2004-261565

(51) Int. Cl.
*G06K 9/36* (2006.01)
(52) U.S. Cl. .................................. 382/232
(58) Field of Classification Search ......... 382/232–233, 382/240, 244–247; 348/384.1, 390.1; 375/240, 375/240.23; 358/426.01, 426.06, 426.08, 358/426.13, 426.14
See application file for complete search history.

(56) References Cited

U.S. PATENT DOCUMENTS

| 5,247,357 | A | * | 9/1993 | Israelsen ................ 375/240.12 |
| 5,402,248 | A | | 3/1995 | Sato et al. .................. 358/426 |
| 5,701,367 | A | | 12/1997 | Koshi et al. ................. 382/239 |
| 5,742,704 | A | | 4/1998 | Suzuki et al. |
| 5,764,804 | A | | 6/1998 | Yajima et al. |
| 5,889,596 | A | | 3/1999 | Yaguchi et al. ............. 358/448 |
| 5,945,930 | A | | 8/1999 | Kajiwara ..................... 341/50 |
| 5,960,116 | A | | 9/1999 | Kajiwara .................... 382/238 |
| 6,028,963 | A | | 2/2000 | Kajiwara |
| 6,031,938 | A | | 2/2000 | Kajiwara ..................... 382/239 |
| 6,067,382 | A | | 5/2000 | Maeda ......................... 382/239 |
| 6,094,510 | A | | 7/2000 | Yaguchi et al. .............. 382/232 |
| 6,097,364 | A | | 8/2000 | Miyamoto et al. ............ 345/97 |

(Continued)

FOREIGN PATENT DOCUMENTS

JP 07-123273 5/1995

(Continued)

OTHER PUBLICATIONS

Li, X., et al., "Block-based Segmentation and Adaptive Coding for Visually Lossless Compression of Scanned Documents", Proceedings of International Conference on Image Processing, vol. 3, pp. 450-453, 2001.

*Primary Examiner*—Jose L Couso
(74) *Attorney, Agent, or Firm*—Fitzpatrick, Cella, Harper & Scinto

(57) ABSTRACT

According to this invention, degradation of the image quality of a decoded image is reduced while losslessly encoded data and lossily encoded data coexist. For this purpose, a first encoding unit performs JPEG encoding for each pixel block, and a second encoding unit performs JPEG-LS encoding. Letting $L_x$ be the code length of encoded data generated by the first encoding unit and $L_y$ be the code length of encoded data generated by the second encoding unit, an encoding sequence control unit selects one of the two encoded data and stores the selected data in a first memory in accordance with whether $L_x$ and $L_y$ satisfy a predetermined non-linear boundary function $f( )$: $L_y \geq f(L_x)$. At this time, when the axis of abscissas represents the code length of the encoded data generated by the second encoding unit and the axis of ordinates represents that of the encoded data generated by the first encoding unit, the non-linear boundary function $f( )$ has a curved portion at the two code lengths.

9 Claims, 22 Drawing Sheets

U.S. PATENT DOCUMENTS

| | | | |
|---|---|---|---|
| 6,101,282 A | 8/2000 | Hirabayashi et al. | 382/246 |
| 6,175,650 B1 | 1/2001 | Sindhu et al. | |
| 6,233,355 B1 | 5/2001 | Kajiwara | 382/238 |
| 6,266,449 B1 | 7/2001 | Ohsawa | 382/239 |
| 6,310,980 B1 | 10/2001 | Kajiwara | 382/238 |
| 6,501,859 B1 | 12/2002 | Kajiwara | 382/239 |
| 6,549,676 B1 | 4/2003 | Kakayama et al. | 382/233 |
| 6,560,365 B1 | 5/2003 | Nakayama | 382/246 |
| 6,650,361 B1 * | 11/2003 | Shiomi | 348/218.1 |
| 6,665,444 B1 | 12/2003 | Kajiwara | 382/240 |
| 6,711,295 B2 | 3/2004 | Kakayama et al. | 382/232 |
| 6,768,819 B2 | 7/2004 | Yamazaki et al. | 382/240 |
| 6,771,828 B1 * | 8/2004 | Malvar | 382/240 |
| 6,847,735 B2 | 1/2005 | Kajiwara et al. | 382/233 |
| 6,853,755 B2 | 2/2005 | Li | |
| 6,879,726 B2 | 4/2005 | Sato et al. | 382/239 |
| 6,879,727 B2 | 4/2005 | Sato et al. | 382/239 |
| 6,917,716 B2 | 7/2005 | Kajiwara et al. | 382/240 |
| 6,931,158 B2 * | 8/2005 | Malvar | 382/240 |
| 6,947,600 B1 | 9/2005 | Sato et al. | 382/233 |
| 6,985,630 B2 | 1/2006 | Kajiwara | 382/233 |
| 6,987,468 B1 | 1/2006 | Malvar | |
| 7,013,050 B2 | 3/2006 | Kajiwara | 382/240 |
| 7,031,536 B2 | 4/2006 | Kajiwara | 382/240 |
| 7,106,909 B2 | 9/2006 | Satoh et al. | 382/239 |
| 7,106,911 B2 | 9/2006 | Ohta et al. | 382/251 |
| 7,110,609 B2 * | 9/2006 | Malvar | 382/240 |
| 7,127,115 B2 | 10/2006 | Osawa et al. | 382/239 |
| 7,136,531 B2 | 11/2006 | Satoh | 382/232 |
| 7,194,140 B2 | 3/2007 | Ito et al. | 382/251 |
| 7,215,818 B2 | 5/2007 | Naito | 382/239 |
| 7,227,998 B2 | 6/2007 | Nakayama et al. | 382/232 |
| 7,257,264 B2 | 8/2007 | Nakayama et al. | 382/239 |
| 7,302,105 B2 | 11/2007 | Kajiwara | 382/240 |
| 7,424,162 B2 | 9/2008 | Kitamura et al. | 382/239 |
| 2003/0031371 A1 | 2/2003 | Kato et al. | 382/239 |
| 2003/0063811 A1 | 4/2003 | Kajiwara | |
| 2003/0086597 A1 | 5/2003 | Ohta et al. | 382/131 |
| 2003/0118242 A1 | 6/2003 | Nakayama et al. | |
| 2003/0164975 A1 | 9/2003 | Aoyagi et al. | 358/1.15 |
| 2004/0013312 A1 | 1/2004 | Kajiwara | |
| 2004/0213347 A1 | 10/2004 | Kajiwara et al. | 375/240.11 |
| 2005/0100226 A1 | 5/2005 | Kajiwara et al. | 382/232 |
| 2005/0249283 A1 | 11/2005 | Kajiwara et al. | 375/240.12 |
| 2006/0023957 A1 | 2/2006 | Ito | 382/232 |
| 2006/0045362 A1 | 3/2006 | Ito et al. | 382/232 |
| 2007/0206867 A1 | 9/2007 | Tamura et al. | |
| 2008/0037882 A1 | 2/2008 | Tamura et al. | |
| 2009/0046777 A1 | 2/2009 | Kitamura | 375/240.02 |

FOREIGN PATENT DOCUMENTS

| | | |
|---|---|---|
| JP | 10-004551 A | 6/1998 |
| JP | 10-004557 A | 6/1998 |
| JP | 10-224640 | 8/1998 |
| JP | 11-164153 | 6/1999 |
| JP | 2001-045301 | 2/2001 |
| JP | 2002-369198 A | 12/2002 |
| JP | 2003-008903 | 1/2003 |
| JP | 2003-125206 | 4/2003 |
| JP | 2003-209698 | 7/2003 |
| JP | 2004-215093 | 7/2004 |
| WO | WO 03/084243 | 10/2003 |

* cited by examiner

F I G. 14
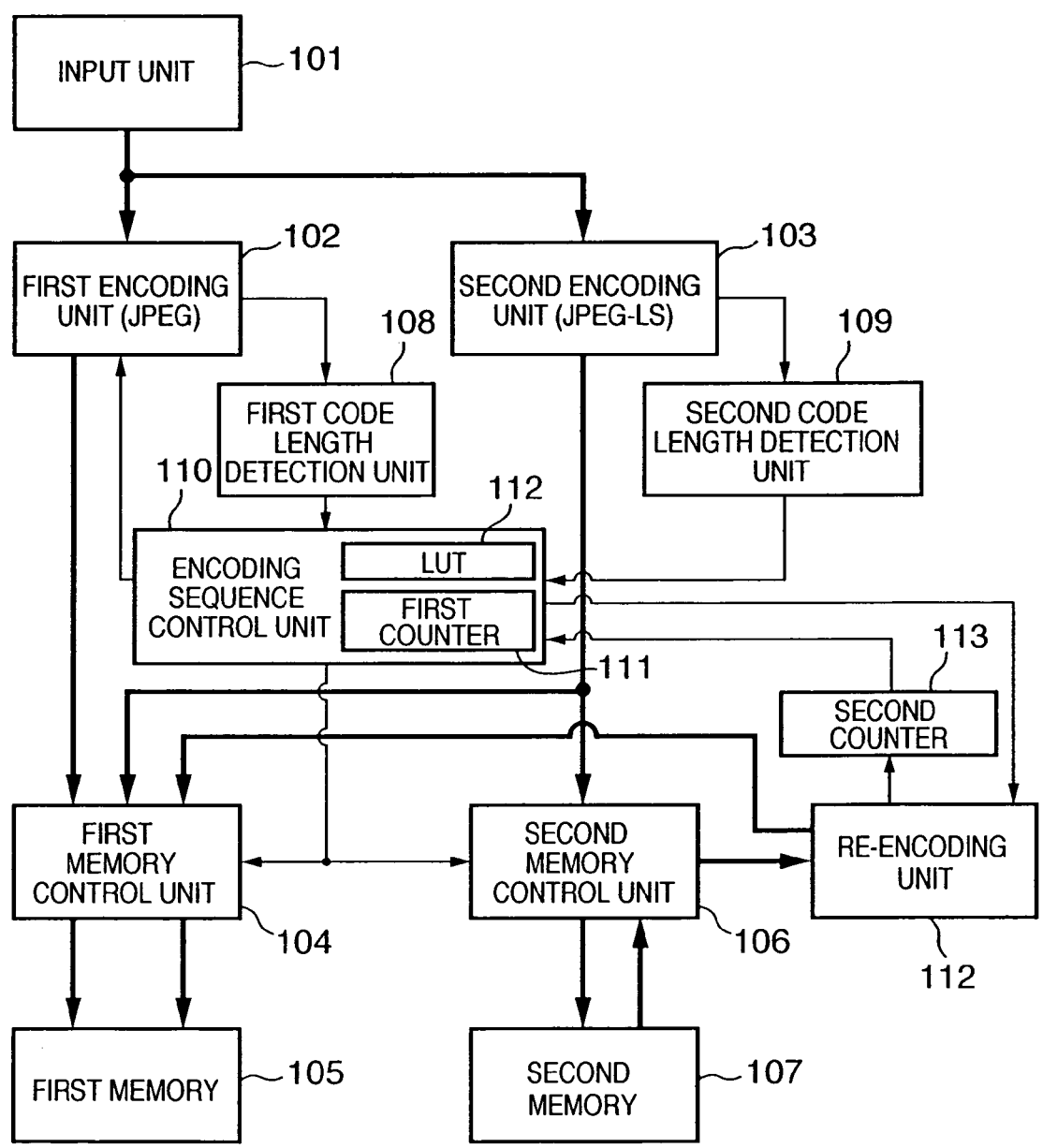

$Q_0 < Q_1 < Q_2 < Q_3 \cdots$

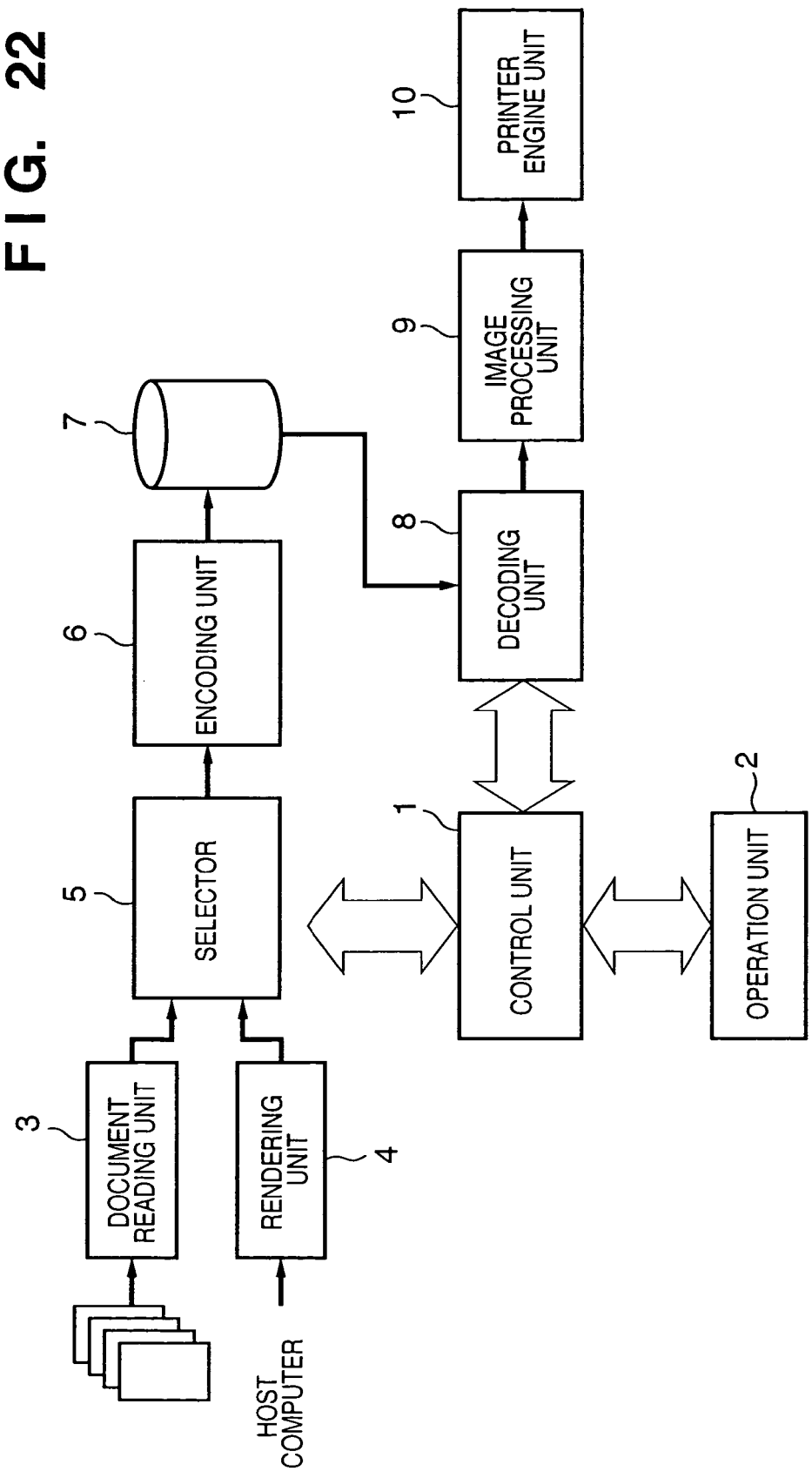

IMAGE ENCODING APPARATUS AND METHOD, COMPUTER PROGRAM, AND COMPUTER-READABLE STORAGE MEDIUM

FIELD OF THE INVENTION

The present invention relates to a technique of encoding image data.

BACKGROUND OF THE INVENTION

As a conventional still image compression scheme, a JPEG scheme using discrete cosine transformation and a scheme using Wavelet transformation are often adopted. An encoding scheme of these types is a variable-length encoding scheme, and hence the code amount changes for each image to be encoded.

According to the JPEG scheme as an international standardization scheme, only one quantization matrix can be defined for an image, and the code amount cannot be adjusted without a prescan. When the JPEG scheme is used in a system which stores data in a limited memory, an overflow of memory may occur.

In order to prevent this, conventional schemes use, for example, a method of re-reading a document upon changing the compression ratio when the actual code amount exceeds an expected code amount, or a method of estimating a code amount in advance by prescan and re-setting quantization parameters to adjust the code amount.

As a conventional code amount control method which executes prescan, for example, there is known a method of storing pre-compressed data in an internal buffer memory, decompressing the data, changing the compression parameter, actually compressing the data, and outputting the compressed data to an external storage. At this time, actual compression requires a higher compression ratio than that of pre-compression.

For example, there is known a method of obtaining a permissible code amount for each pixel block and Huffman-encoding a coefficient prepared by n-time level shifting of the DCT coefficient in order to reduce the code amount. The shift count n is determined from the permissible code amount.

There is also proposed a method of generating encoded data which effectively falls within the size by one image input (Japanese Patent Laid-Open No. 2003-8903). According to this method, two memories for storing encoded data are prepared, and encoded data are stored in the two memories. When the amount of stored encoded data reaches a target data amount, a larger quantization step for a higher compression ratio is set, and one memory (first memory) is cleared. With this setting, the compression ratio of encoding after the encoded data amount reaches the target data amount is increased. Since encoded data before the generated code amount reaches the target data amount are stored in the other memory (second memory), the data are re-encoded at a larger quantization step, and the re-encoding results are stored in the first memory. This process is repeated every time the data amount reaches the target data amount.

Some methods adopt not only the above-mentioned lossy encoding method but also a lossless encoding method. The lossless encoding method is applied to non-natural pictures such as a character image and line image, whereas the lossy encoding method is applied to natural pictures. For this purpose, there is proposed a method of determining the attribute of each part of an image in advance, and switching the encoding method on the basis of the determination result (Japanese Patent Laid-Open No. 7-123273).

Unlike the technique (Japanese Patent Laid-Open No. 2003-8903) of executing re-encoding in accordance with the encoded data amount in the process of encoding, a technique of keeping an entire image in a predetermined code amount while selectively applying either of lossless encoding and lossy encoding to a plurality of areas in an image is also available (Japanese Patent Laid-Open No. 10-224640).

However, the compression encoding technique in Japanese Patent Laid-Open No. 2003-8903 uses only a lossy compression technique such as JPEG. If the data amount does not fall within a predetermined size, the quantization step is set larger to uniformly increase the compression ratio of an entire image, which is highly likely to degrade the image. Especially when an image containing a character/line image and natural picture is to be compression-encoded, the natural picture is hardly influenced by the increase in quantization step, but the influence on the character/line image cannot be ignored.

To solve this problem, encoding specialized in each area is performed by applying lossless encoding to a character/line image and lossy encoding to a natural picture, and encoding with high image quality can be expected. To implement this, however, an attribute determination process for images must be performed as a pre-process, and the attribute must be accurately determined.

SUMMARY OF THE INVENTION

The present invention has been made in consideration of the above situation, and has as its object to provide a technique of efficiently compression-encoding an image containing a character/line image and natural picture, and also generating encoded data with high image quality without using any special area determination technique.

In order to solve the conventional problems, an image encoding apparatus according to the present invention has, for example, the following arrangement.

That is, there is provided an image encoding apparatus which encodes image data for each pixel block, comprising first encoding means for lossily encoding input image data for each pixel block to generate encoded data, second encoding means for losslessly encoding input image data for the pixel block to generate encoded data, and selection means for, letting Lx be a code length of the encoded data generated by the second encoding means and Ly be a code length of the encoded data generated by the first encoding means, when Lx and Ly satisfy a predetermined non-linear boundary function f( ):

$$Ly \geq f(Lx)$$

selecting and outputting the encoded data generated by the second encoding means, and when Lx and Ly do not satisfy the function, selecting and outputting the encoded data generated by the first encoding means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14 is a block diagram showing a modification of the encoding unit according to the second embodiment;

FIG. 22 is a block diagram showing a copying machine to which the embodiment is applied.

DETAILED DESCRIPTION OF THE PREFERRED EMBODIMENTS

Figure 1:
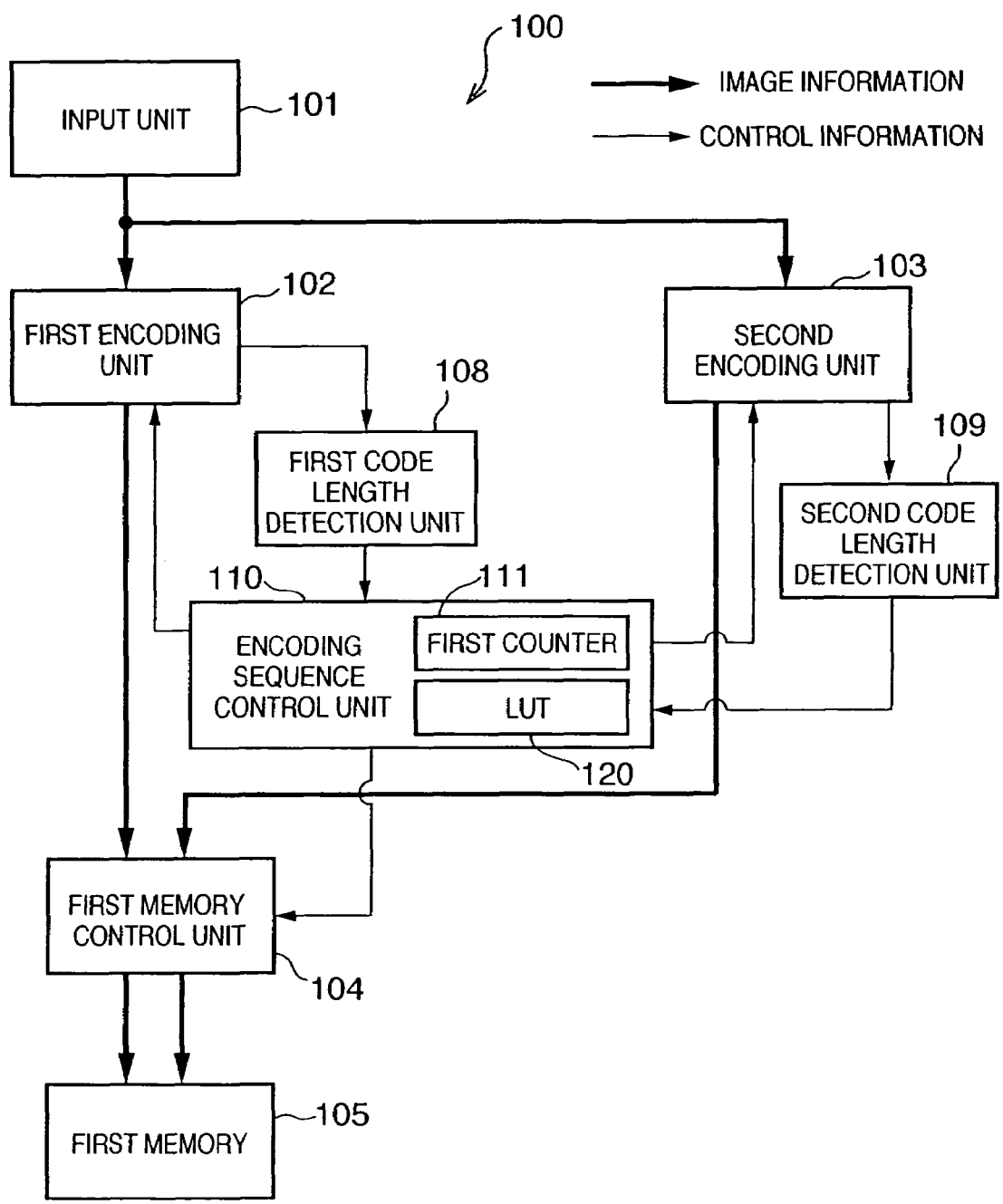
FIG. 1 is a block diagram showing an encoding unit according to the first embodiment.

Preferred embodiments of the present invention will be described in detail below with reference to the accompanying drawings.

<Description of Outline of Apparatus>

FIG. 22 is a block diagram showing a copying machine to which an embodiment is applied.

In FIG. 22, reference numeral 1 denotes a control unit which controls the overall apparatus, and is made up of a CPU, ROM, RAM, and the like. Reference numeral 2 denotes an operation unit which is made up of an LCD display, various switches, buttons, and the like. Reference numeral 3 denotes a document reading unit (image scanner unit) which includes an ADF (Auto Document Feeder). The document reading unit 3 outputs a read image as digital data of 8 bits (256 gray levels) for each of R, G, and B color components. Reference numeral 4 denotes a rendering unit which renders a print image on the basis of PDL print data received via an interface (including a network interface: not shown). Reference numeral 5 denotes a selector which selects and outputs one of bitmap images output from the document reading unit 3 and rendering unit 4 in accordance with an instruction from the control unit 1.

Reference numeral 6 denotes an encoding unit which is a feature of the embodiment. Although details of the encoding unit 6 will be described later, the encoding unit 6 encodes image data.

Reference numeral 7 denotes a secondary storage device (in the embodiment, a hard disk drive) which sequentially stores encoded data output from the encoding unit 6.

Reference numeral 8 denotes a decoding unit which reads out and decodes, in the storage order, compression-encoded image data that are stored in the secondary storage device 7. Reference numeral 9 denotes an image processing unit which receives a decoded image from the decoding unit 8, and performs conversion from an RGB color space into a YMC print color space, a UCR (Under Color Removal) process, and in addition an image data correction process.

Reference numeral 10 denotes a printer engine unit whose printing mechanism is a laser beam printer engine, but can be of an arbitrary type for, e.g., discharging liquid ink.

In the above arrangement, for example, the user operates the operation unit 2 to select a copy mode, sets a document on (the ADF of) the document reading unit 3, and presses a copy start key. Then, document image data read by the document reading unit 3 are transferred in the raster order to the encoding unit 6 via the selector 5, compression-encoded by the encoding unit 6, and stored in the secondary storage device 7.

When print data is externally received, the selector 5 selects the rendering unit 4, an image based on print data generated by the rendering unit 4 is compression-encoded, and the encoded data is stored in the secondary storage device 7.

The decoding unit 8 reads out compression-encoded data from the secondary storage device 7, and decodes the readout data in accordance with the print speed of the printer engine 10. The image processing unit 9 generates print image data of Y, M, C, and K (Black) components from the decoded image data. The image processing unit 9 outputs the process result to the printer engine unit 10 to print.

As described above, a compression-encoded data storage process to the secondary storage device 7 and a read process for decoding and printing are asynchronous. That is, the secondary storage device 7 functions as a buffer interposed between an image compression process and a decoding process. Since a document reading/encoding process is independent of a decoding/printing process, many documents can be read at a high speed, and the process can quickly shift to document reading of the next job.

The arrangement of the overall apparatus in the embodiment has been described. The encoding unit 6 as a feature of the apparatus will be explained in the following embodiments.

<Description of Encoding Unit>

FIG. 1 is a block diagram showing the encoding unit 6 according to the embodiment.

An input unit 101 incorporates a line buffer memory for a plurality of lines. As described above, the input unit 101 receives image data from the document reading unit 3 or rendering unit 4 via the selector 5 in the raster order, stores the image data in the internal line buffer, and outputs it by a block of N×M pixels (in the embodiment, a block of 8×8 pixels).

A first encoding unit 102 is a lossy encoding unit which compression-encodes each pixel block input from the input unit 101 in accordance with a parameter which influences the compression ratio, and outputs the result (encoded data). An identification bit representing that data has been encoded by the first encoding unit 102 is added at the start of the encoded data.

The image encoding unit 102 according to the embodiment adopts JPEG encoding (lossy encoding). More specifically, image data corresponding to 8×8 pixels is orthogonally transformed, quantized using a quantization step (to be described later), and undergoes a Huffman encoding process. The quantization step determines a generated code amount, and is set by an encoding sequence control unit 110. JPEG encoding is known as a technique suitable for natural pictures.

Figure 21:
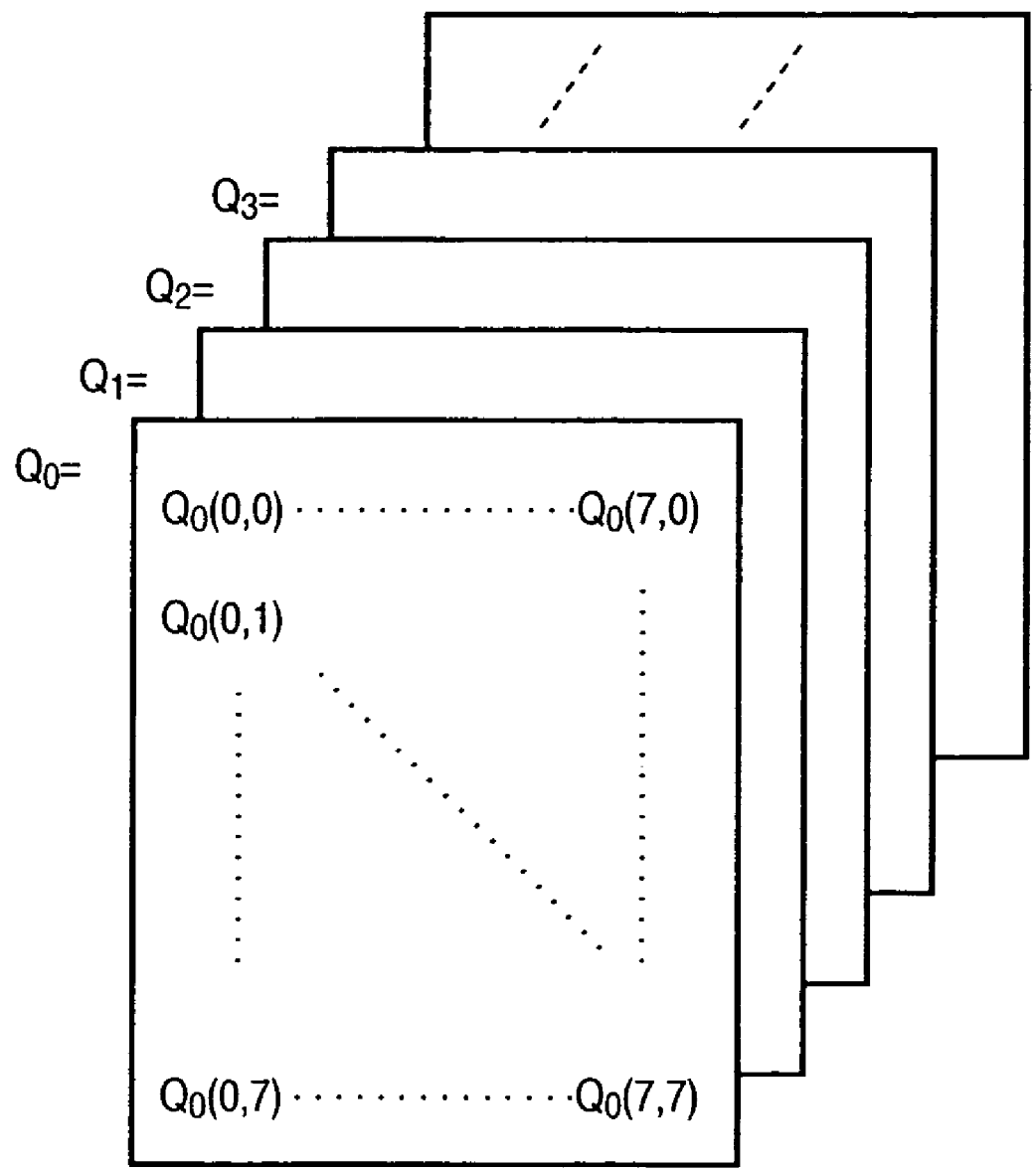
FIG. 21 is a view showing a quantization matrix table used in the embodiment.

FIG. 21 shows quantization matrix tables Q0, Q1, and Q2 which are used to quantize the frequency coefficient after DCT transformation (which are stored and held in the encoding sequence control unit 110). Values Qi(0,0) to Qi(7,7) (i=0, 1, 2, ...) in the quantization matrix table mean quantization step values. Quantization step values substantially satisfy Q0<Q1<Q2 .... As the quantization step value increases, a possible range of the frequency coefficient value after quantization narrows, and the compression ratio increases.

A second encoding unit 103 is a lossless encoding unit, unlike the first encoding unit 102. Because of lossless encoding, the decoding result is identical to an image before encoding, and the image quality does not degrade in principle. At this time, a parameter which influences the compression ratio is not set. In the embodiment, the second encoding unit 103 adopts JPEG-LS. "JPEG" is prefixed to JPEG-LS, but its algorithm is completely different from lossy encoding "JPEG" which is employed in the first encoding unit. JPEG-LS encoding is suited to character/line images and computer graphics. This technique can generate, from such an image, encoded data which is smaller than a quantization step "1" (substantially lossless) given to lossy encoding "JPEG", and also a relatively small quantization step value such as "2" or "3".

At substantially the same timing as that of the first encoding unit 102, the second encoding unit 103 encodes the same pixel block and outputs encoded data. In outputting encoded data, the second encoding unit 103 adds at the start of the encoded data an identification bit representing that the data has been encoded by the second encoding unit 103.

A first code length detection unit 108 detects the length (including one bit serving as an identification bit) of encoded data of a pixel block output from the first encoding unit 102, and outputs the detected length to the encoding sequence control unit 110. A second code length detection unit 109 detects the length (including one bit serving as an identification bit) of encoded data of a pixel block output from the second encoding unit 103, and outputs the detected length to the encoding sequence control unit 110.

The encoding sequence control unit 110 controls the encoding unit 6 in the embodiment. As one of processes, the encoding sequence control unit 110 decides encoded data to be stored in a first memory 105 by using signals from the first and second code length detection units 108 and 109 and an LUT (Look Up Table) 120 incorporated in the encoding sequence control unit 110 (the selection principle will be described later). The encoding sequence control unit 110 outputs to the first memory control unit 104 a selection signal for selecting the decided encoded data.

The encoding sequence control unit 110 comprises a first counter 111 which accumulates and counts code length data of encoded data to be stored in the first memory 105. The first counter 111 corresponds to a block of interest, accumulates the length of encoded data stored in the first memory 105, and holds information representing the total encoded data amount in the first memory 105.

The encoding sequence control unit 110 compares the value (encoded data amount in the first memory 105) of the counter 111 and a target data amount (decided depending on the size of an input image). When the encoding sequence control unit 110 detects that the value of the counter 111 has reached the target data amount (exceeds the target value), the encoding sequence control unit 110 outputs a control signal to the memory control unit 104 so as to discard the data stored in the memory 105, and clears the counter 111 to 0. Further, the encoding sequence control unit 110 requests the control unit 1 (see FIG. 22) to input an image again.

In this manner, when the value of the counter 111 exceeds the target data amount, image data is input again. To input image data again, the quantization step Qi which has been set for the first encoding unit 102 is changed to the next quantization step Qi+1 to increase the compression ratio. After that, encoding resumes.

If encoding of one page is completed while the value of the counter 111 does not exceed the target data amount, encoded data of a page of interest in which losslessly and lossily encoded data coexist is generated in the first memory 105, and output to the secondary storage device 7. When image data of the next page exists (or the next document exists), encoding of the image data starts.

An outline of the process contents by the encoding unit 6 in the embodiment has been described. The principle of deciding encoded data to be stored in the first memory 105 by the encoding sequence control unit 110 according to the embodiment will be explained.

In the embodiment, the first encoding unit 102 employs lossy encoding "JPEG", whereas the second encoding unit 103 employs lossless encoding "JPEG-LS". As is well known, JPEG is an encoding technique suitable for compression of natural pictures, but the compression ratio of JPEG is not high for character/line images and the like. In contrast, JPEG-LS is suitable for character/line images (including color images) and CG images (e.g., monotonic bar graph), and does not degrade an image in principle because of lossless encoding. However, the compression ratio of JPEG-LS is not high for natural pictures. That is, these two encoding techniques are complementary to each other.

Figure 20:
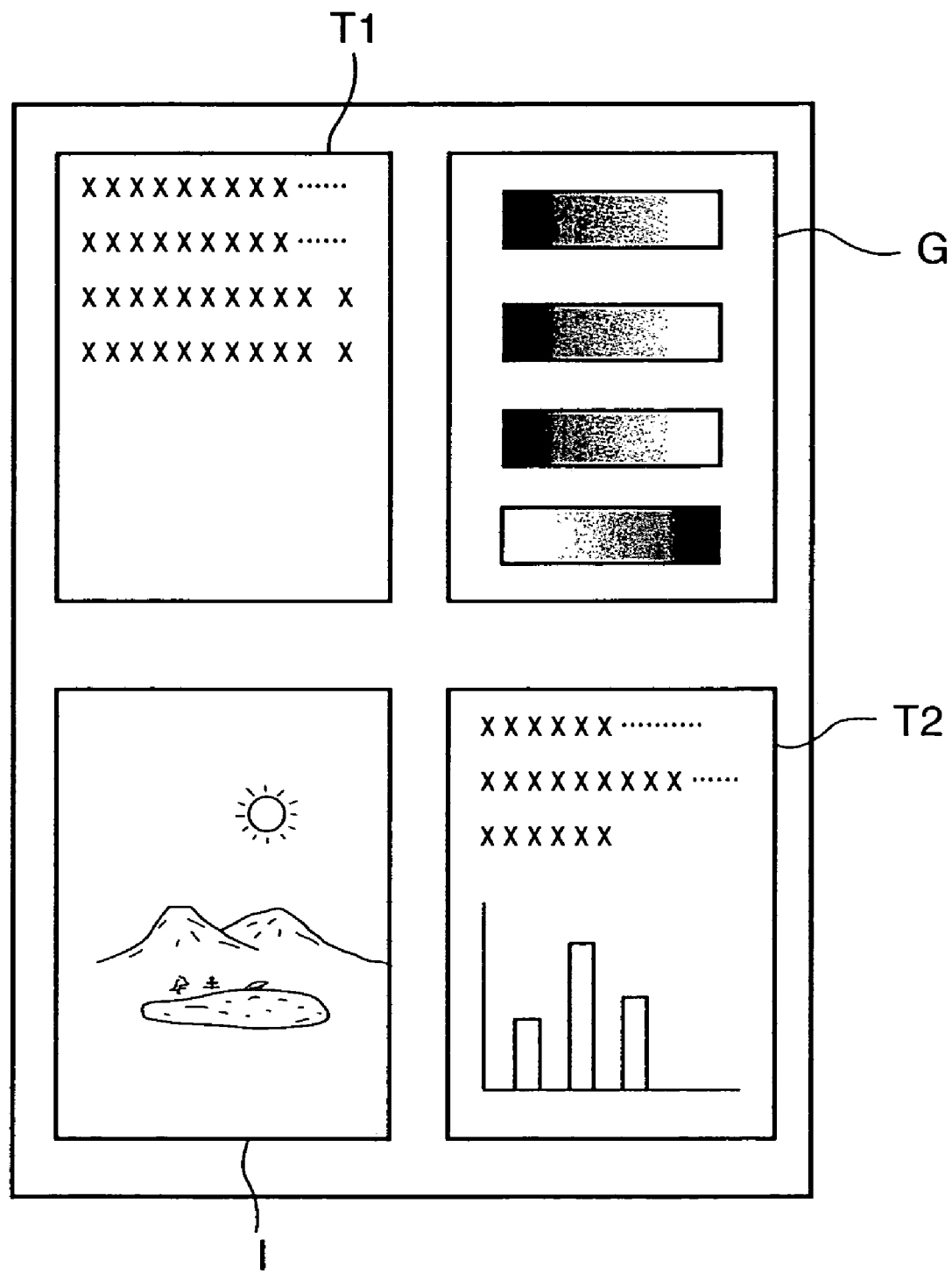
FIG. 20 is a view showing a sample document image.

A case wherein a document containing character/line image areas T1 and T2, a gradation (image whose density changes smoothly) area G by computer graphics, and a natural picture area I, as shown in FIG. 20, is read will be considered.

Assume that only character/line images whose edges are sharp exist in the character/line image area T1, and only character/line images whose edges slightly blur exist in the character/line image T2. The character/line image area T2 corresponds to a case wherein an anti-aliasing process for making the outline of a character or figure look smooth is performed, or digital resolution conversion is performed.

Figure 18:
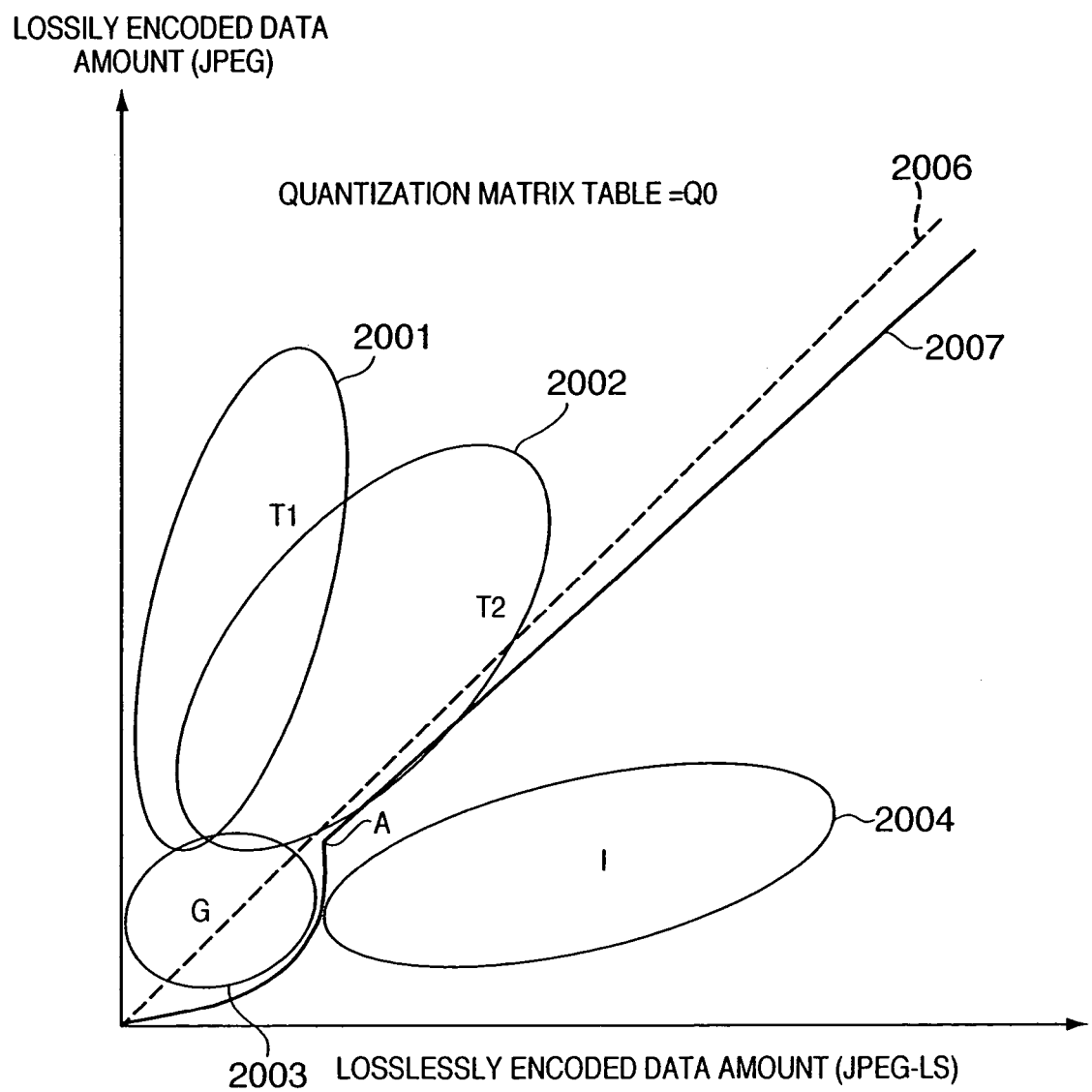
FIG. 18 is a graph for explaining a boundary condition used to select one of losslessly encoded data and lossily encoded data according to the embodiment.

FIG. 18 shows the result of plotting points P(Lx,Ly) having coordinates Lx and Ly, where Lx represents the code length of encoded data obtained by reading the document shown in FIG. 20 and losslessly encoding each 8×8 pixel block, and Ly represents the code length of encoded data obtained by lossily encoding the same pixel block (quantization step Q0).

Elliptic distribution areas 2001 to 2004 in FIG. 18 are substantial distribution areas of plotted points in the areas T1, T2, G, and I. Some points are plotted outside the elliptic area, but the number of such plotted points is small and these points are ignored as irregular points. A broken line 2006 shown in FIG. 18 is a straight line representing a relation Ly=Lx.

In terms of the compression efficiency of encoded data, encoded data to be stored in the first memory 105 can be decided under the following conditions.
1. For Ly<Lx, the first memory 105 stores lossily encoded data from the first encoding unit 102.
2. For Ly≧Lx, the first memory 105 stores losslessly encoded data from the second encoding unit 103.

With these settings, the total encoded data amount of one page in the first memory 105 can be suppressed to the minimum data amount.

For the boundary condition Ly=Lx, however, the computer gradation area G is divided by the boundary 2006, and lossily encoded data and losslessly encoded data coexist in respective pixel blocks. In some cases, pixel blocks of losslessly encoded data and those of lossily encoded data alternately appear. If such data is decoded, block noise is generated to make the boundary of pixel blocks discontinuous, degrading the image quality.

To prevent this problem, the embodiment sets a non-linear boundary condition given by a solid line 2007 in FIG. 18. More specifically, the embodiment sets a curve which passes through the intermediate position between the distribution area 2003 of the computer gradation area G and the distribution area 2004 of the natural picture area I and has a convex shape when viewed from the bottom (or a concave shaped when viewed from the top) along the lower portion of the distribution area 2003. This curve also passes between the distribution area 2002 of the character/line image area T2 and the distribution area 2004 of the natural picture area I.

Although the curved portion of the boundary 2007 passes between the computer gradation area G and the natural picture area I in FIG. 18, the boundary 2007 does not always pass outside the computer gradation area G and is desirably obtained using many samples. In any case, losslessly encoded data is highly likely to be employed for an image of a relatively small code amount, as represented by the boundary 2007 in the embodiment in comparison with the simple linear boundary condition 2006, thus suppressing occurrence of the above-described problem. Since a portion at which the boundary becomes non-linear is an area where the code lengths of lossy encoding and lossless encoding are short, the influence on the code data amount of an entire image can also be reduced.

In this case, Ly=f(Lx) represents a boundary condition given by the solid line 2007.
1. For Ly<f(Lx), the first memory 105 stores lossily encoded data from the first encoding unit 102.
2. For Ly≧f(Lx), the first memory 105 stores losslessly encoded data from the second encoding unit 103.

As a result, the computer gradation area is less likely to contain encoded data of different encoding types, and occurrence of the above problem can be suppressed. In FIG. 18, an area where the code length is longer than that at a point A (≈the maximum value of the losslessly encoded data length in the computer gradation area+α) is defined by a straight line. This area may be defined by a curve along the distribution area 2002, and by a straight line Ly=Lx for a predetermined code length.

According to the embodiment, when the value of the first counter 111 exceeds a target data amount, the quantization matrix table set for the first encoding unit 102 is changed from Q0 to Q1, and an image is input again. That is, the second image data encoding process (or second document read) uses a larger quantization step value in encoding, and thus an encoded data amount generated by the first encoding unit 102 becomes smaller than that in the first encoding process.

Figure 19:
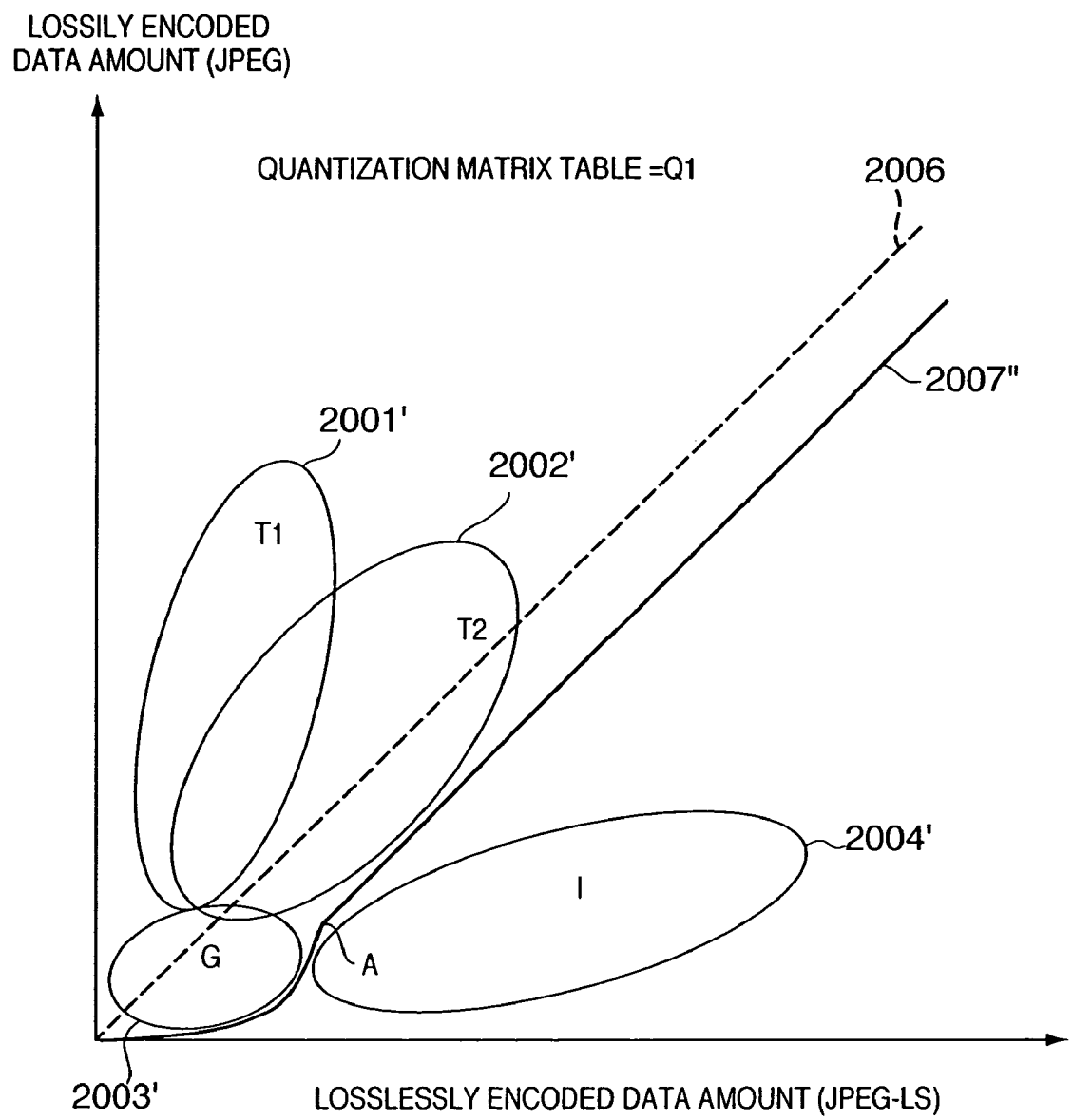
FIG. 19 is a graph for explaining the boundary condition used to select one of losslessly encoded data and lossily encoded data according to the embodiment.

Consequently, the distribution areas 2001 to 2004 in FIG. 18 shift toward a smaller data amount with respect to the axis of ordinates, contract along the axis of ordinates, and become distribution areas 2001' to 2004' shown in FIG. 19. A boundary condition 2007" at this time must be changed close to a simple comparison, and the curve shifts down. Accordingly, coexistence of different encoding methods in the same object is permitted, and the image quality degrades from that in the first encoding. However, since the lossless encoding method is preferentially selected, a larger number of losslessly encoded blocks in the memory can be selected.

The above-described principle and the process of the encoding sequence control unit 110 in the embodiment can be summarized as follows.

In this case, Qi represents a quantization matrix table set for the first encoding unit 102, and Ly=$f_i$(Lx) is a boundary condition-function.
1. For Ly<$f_i$(Lx), a signal for selecting lossily encoded data from the first encoding unit 102 for the first memory 105 is output to the first memory control unit 104.
2. For Ly≧$f_i$(Lx), a signal for selecting losslessly encoded data from the second encoding unit 103 for the first memory 105 is output to the first memory control unit 104.

To realize this process, the encoding sequence control unit 110 may incorporate the function $f_i$( ) and execute comparison operation every time encoded data is selected. However, in order to simplify the process, the encoding sequence control unit 110 incorporates the LUT (Look Up Table) 120.

Figure 2:
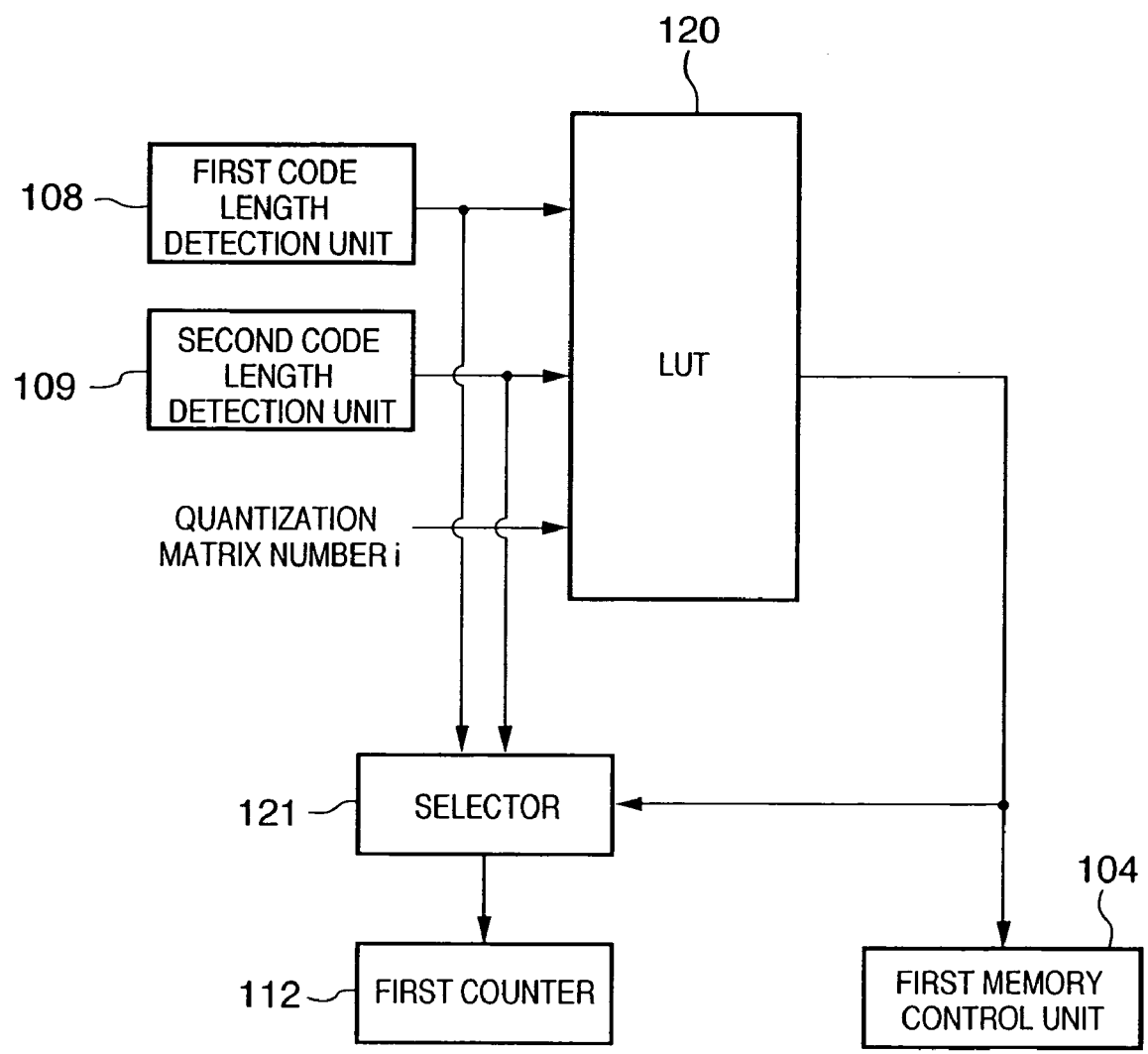
FIG. 2 is a block diagram showing part of an encoding sequence control unit in FIG. 1 that executes an encoded-data selection process.

An arrangement associated with selection of encoded data by using the LUT 120 in the encoding sequence control unit 110 can be implemented by, e.g., the arrangement shown in FIG. 2.

The LUT 120 receives, as addresses, code length data from the first code length detection unit 108, code length data from the second code length detection unit 109, and a quantization matrix table number i for specifying the quantization matrix table Qi set for the first encoding unit 102. The quantization matrix table number i can also be regarded as a signal for selecting the tables of boundary condition functions fi.

A 1-bit signal is stored in advance at an address position in the LUT 120. For example, 1 is stored at an address position having a relation Ly≧$f_i$(Lx), and 0 is stored at an address position having a relation Ly<$f_i$(Lx).

Upon addressing, the LUT 120 outputs an addressed bit as an encoded-data selection signal to the first memory control unit 104. The encoded-data selection signal is also supplied as a selection signal for a selector 121. The selector 121 selects the selected code length data, and the first counter 111 accumulates and adds the data.

Figure 3:
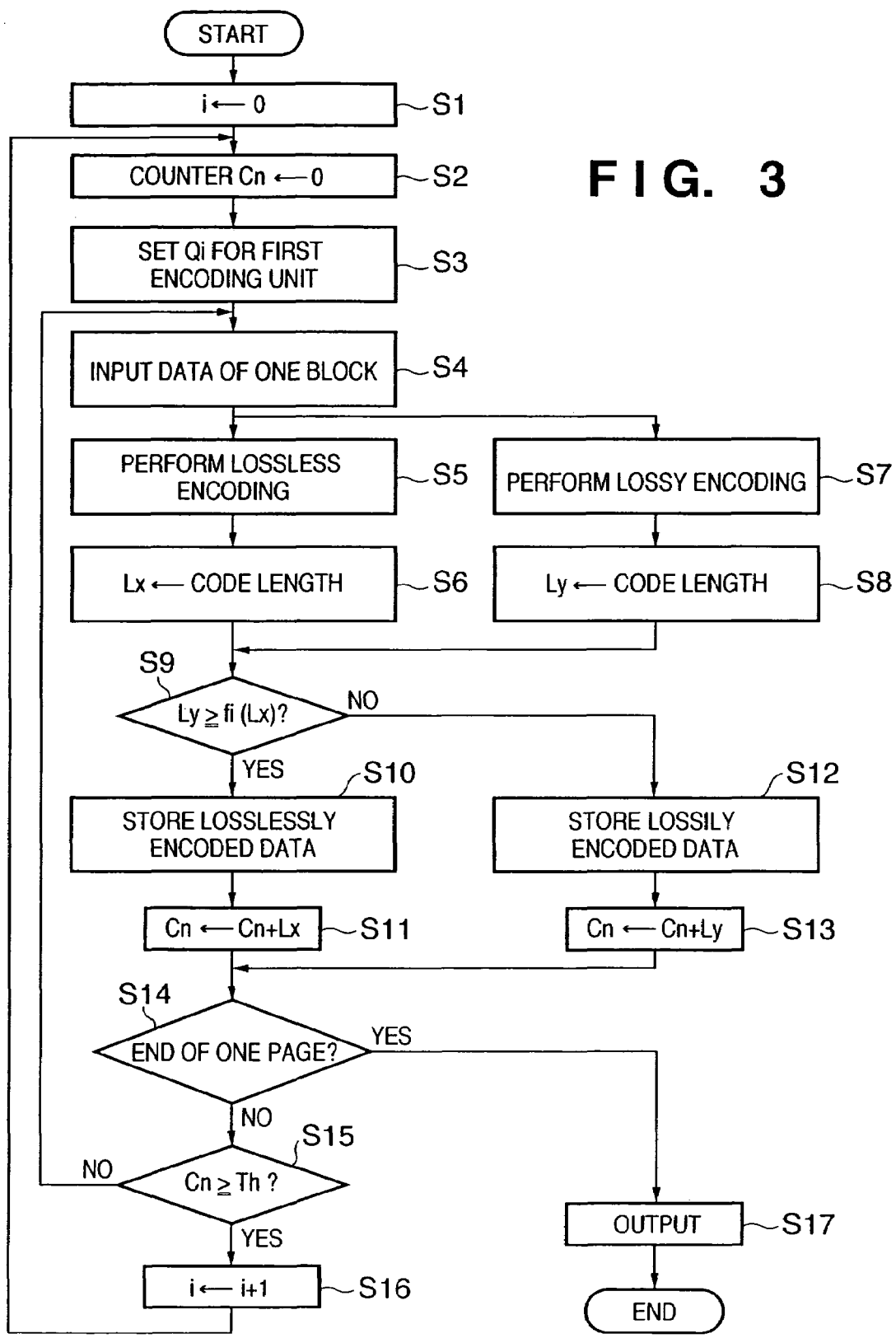
FIG. 3 is a flowchart showing an encoding process sequence according to the first embodiment.

In order to implement the above process, the encoding sequence control unit 110 executes a process according to the flowchart of FIG. 3.

In step S1, 0 is set as an initial value at a variable i. In step S2, a variable Cn corresponding to the first counter 111 is cleared to 0.

A quantization matrix table Qi is set for the first encoding unit 102 in step S3, and data of one pixel block is input in step S4. Lossless encoding is executed by the second encoding unit 103 in step S5, and an encoded data length Lx is obtained in step S6. In parallel to this, lossy encoding is executed in steps S7 and S8, and the code length Ly of encoded data is obtained.

FIG. 3 shows an example in which steps S5 and S6 and steps S7 and S8 are parallel-executed. The same process can be achieved when it is implemented by a computer program and a multitask OS runs. When this process is implemented by a single-task OS, the process proceeds in an order of steps S5, S6, S7, and S8.

In step S9, it is determined whether $Ly \geq f_i(Lx)$ is satisfied. If this relation is satisfied, losslessly encoded data is stored in the first memory in step S10. In step S11, the code length Lx is added to the counter Cn.

If it is determined in step S9 that $Ly < f_i(Lx)$, lossily encoded data is stored in the first memory in step S12. In step S13, the code length Ly is added to the counter Cn.

The flow advances to step S14 to determine whether the encoding process of one page has ended. In this determination, it is determined whether the number of input pixel blocks has reached the total number of pixel blocks of one page.

If it is determined in step S14 that the encoding process of one page has not ended, the flow advances to step S15 to determine whether the value of the counter Cn becomes equal to or larger than a threshold T representing the target data amount. If NO in step S15, the flow returns to step S4 in order to input the next pixel block.

If it is determined in step S15 that the value of the counter Cn becomes equal to or larger than the threshold T, the flow advances to step S16 to increment the variable i by "1", and then returns to step S2 in order to input an image from the start of the page again.

If it is determined in step S14 that the encoding process of one page is completed, the flow advances to step S17 to output the encoded data stored in the first memory 105 to the secondary storage device 7.

As described above, according to the embodiment, encoded data equivalent to data obtained by executing a proper encoding process for each area while using both lossless encoding and lossy encoding can be generated without arranging any special area determination circuit. When encoded data exceeds target encoded data, the quantization matrix table is changed to input and encode image data again. Thus, encoded data of a target data amount or less can be generated successfully.

Description of Second Embodiment

In the above embodiment (first embodiment), when a generated encoded data amount exceeds a target data amount during encoding of one page, image data is input again.

The second embodiment will describe an example in which encoded data of a target data amount or less is generated without inputting a 1-page image again.

The arrangement of an apparatus is the same as that in FIG. 22, and the second embodiment will be explained by giving attention to an encoding unit 6.

Figure 4:
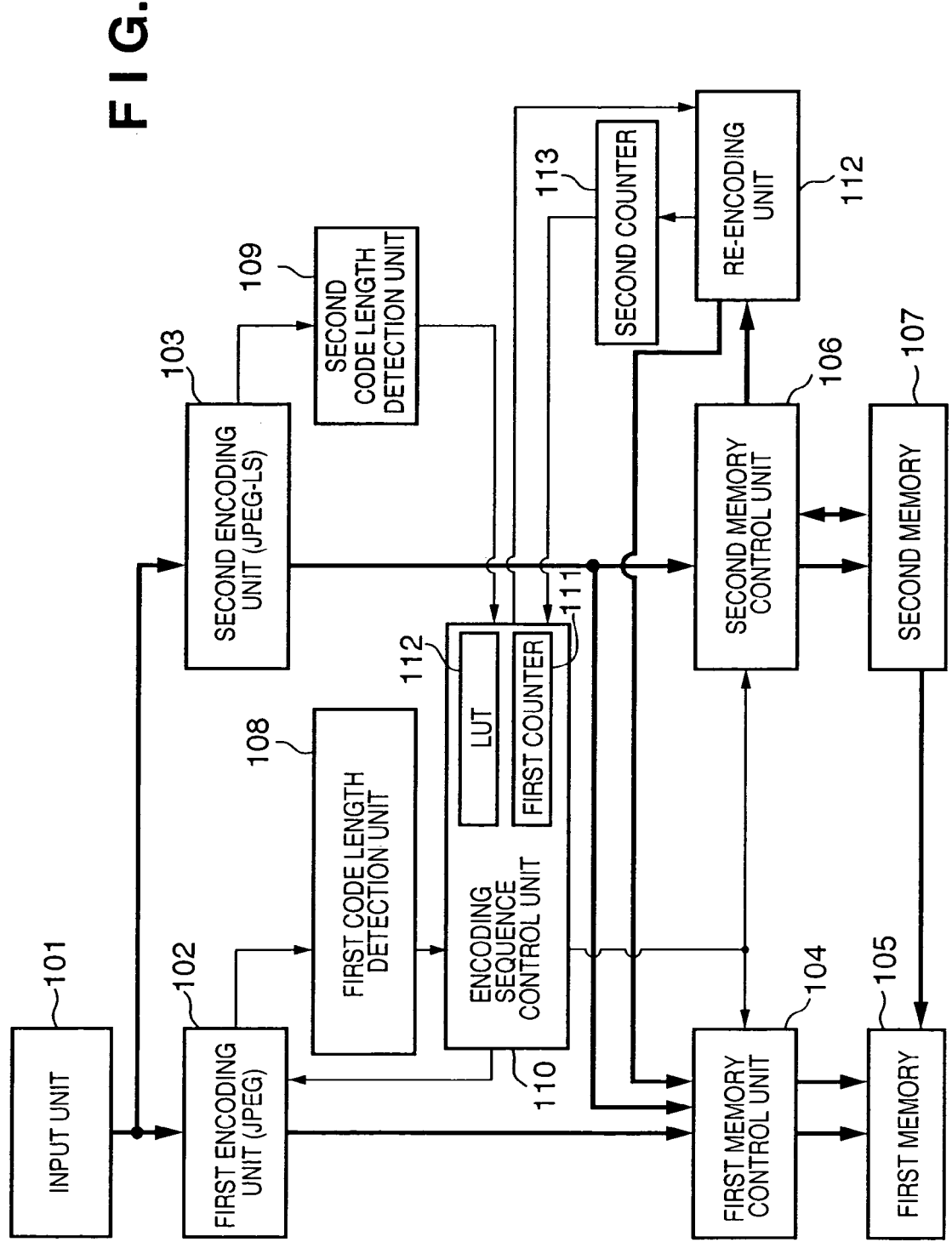
FIG. 4 is a block diagram showing an encoding unit according to the second embodiment.

FIG. 4 is a block diagram showing the encoding unit 6 according to the second embodiment. The encoding unit 6 is different from that in FIG. 1 in that a second memory control unit 106, second memory 107, re-encoding unit 112, and second counter 113 are added. The remaining arrangement is the same as that in FIG. 1, and the same reference numerals denote the same parts.

A first memory 105 stores encoded data which is selected in accordance with the same determination criterion as that in the first embodiment described above, and a description thereof will be omitted. Hence, features of the second embodiment will be explained.

The second memory control unit 106 performs a process of storing encoded data generated by a second encoding unit 103 in the second memory 107, and a process of reading out encoded data from the second memory 107 under the control of an encoding sequence control unit 110. The second memory 107 is used as a work area when 1-page image data is encoded.

The re-encoding unit 112 re-encodes encoded data in a range designated by the encoding sequence control unit 110 out of encoded data (losslessly encoded data) stored in the second memory 107. The re-encoding unit 112 has, e.g., an arrangement in FIG. 13.

Since the second memory 107 stores data losslessly encoded by the second encoding unit (JPEG-LS encoding unit) 103, the encoded data is decoded (reconstructed) into a pixel block of an original image by a JPEG-LS decoding unit 112a. A JPEG encoding unit 112b JPEG-encodes (lossily encodes) the reconstructed pixel block in accordance with a quantization matrix table Qi set by the encoding sequence control unit 110. At this time, an identification bit representing losslessly encoded data is added at the start of the encoded data.

A code length detection unit 112c detects the code length of JPEG-encoded data, whereas a code length detection unit 112d detects the code length of losslessly encoded data which is read out from the second memory. An LUT 112e stores the same information as that of an LUT 120 in the encoding sequence control unit 110. The LUT 112e receives, as addresses, two code length data and a quantization matrix table number i from the encoding sequence control unit 110, and outputs a 1-bit signal as a selection signal.

A selector 112f selects encoded data having a shorter code length out of losslessly encoded data and lossily encoded data in accordance with a selection signal from the LUT 112e, and outputs the selected encoded data to the second memory control unit 106. The second memory control unit 106 causes the second memory 107 to store the selected encoded data. The other selector 112g selects the code length of the selected encoded data, and the second counter 113 accumulates and adds the selected code length.

This process is repetitively executed for a range designated by the encoding sequence control unit 110. The second counter 113 is reset at the start of re-encoding by the re-encoding unit 112, and accumulates and counts an encoded data amount generated by the re-encoding unit 112. Upon the completion of re-encoding in the set range, a value (encoded data amount generated by re-encoding) held in the second counter is output to the encoding sequence control unit 110.

The arrangement in FIG. 4 has been described, and the overall process will be explained in more detail.

When encoding of 1-page image data starts, a target data amount corresponding to an input image size is set by a control unit 1 in the encoding sequence control unit 110. The encoding sequence control unit 110 sets the initial quantization matrix table Q0 (encoding parameter corresponding to the highest image quality) for a first encoding unit 102, and clears a first counter 111 to 0. The encoding sequence control unit 110 causes the first and second encoding units 102 and 103 to start an encoding process. The following description pertains to input and an encoding process of 1-page image data.

The first and second encoding units 102 and 103 output encoded data of the same pixel block. First and second code length detection units 108 and 109 detect the code lengths of the encoded data, and output the detected code lengths. The encoding sequence control unit 110 selects one of the encoded data, and causes the first counter 111 to add code length information of the selected encoded data, similar to the first embodiment, i.e., according to the arrangement of FIG. 2. At this time, the encoding sequence control unit 110 outputs to a first memory control unit 104 a control signal representing which of the encoded data has been selected.

The first memory control unit 104 receives the control signal from the encoding sequence control unit 110, selects encoded data whose code length is determined to be shorter, and stores the encoded data in the first memory 105.

As a result, the first memory 105 stores encoded data of a shorter code length for each pixel block of image data. That is, the first memory 105 stores both losslessly encoded data and lossily encoded data. To the contrary, the second memory 107 stores only losslessly encoded data.

It should be noted that the first counter 111 stores information on the total code amount of encoded data stored in the first memory 105.

The above process is the same as that in the first embodiment except that losslessly encoded data is stored in the second memory 107.

While the encoding process progresses, the encoding sequence control unit 110 monitors the value of the first counter 111, i.e., the total amount of encoded data stored in the first memory 105, and determines whether the total amount has exceeded (or has reached) the target data amount. If the encoding sequence control unit 110 determines that the value (total code amount) held by the first counter 111 has exceeded the target data amount, the encoding sequence control unit 110 executes the following process.

Step 1). The encoding sequence control unit 110 outputs a control signal to the first memory control unit 104 so as to discard data stored in the first memory 105. Based on the control signal, the first memory control unit 104 discards the stored encoded data by clearing the memory address counter or clearing the encoded-data management table.

Step 2). The encoding sequence control unit 110 clears the first counter 111 to 0 (input of an image from the input unit 101 continues).

Step 3). The encoding sequence control unit 110 updates the quantization matrix table in order to cause the first encoding unit 102 to perform encoding at a compression ratio higher than the current one. When the currently set quantization matrix table is Qi, the encoding sequence control unit 110 sets a quantization matrix table Qi+1. Since the quantization matrix table Q0 is set in the initial state, the quantization matrix table Q1 is set when it is determined for the first time that the total amount has exceeded the target amount.

Step 4). The encoding sequence control unit 110 clears the second counter 113 to 0, sets the quantization matrix table Qi+1 for the re-encoding unit 112, and starts re-encoding of encoded data stored in the second memory 107. Encoded data (including both losslessly and lossily encoded data) obtained by re-encoding are stored again in the second memory 107. The second memory 107 also stores encoded data from the second encoding unit 103, and the encoded data from the first and second encoding units 102 and 103 are distinctively stored.

Step 5). Upon the completion of re-encoding, the encoding sequence control unit 110 transfers the encoded data stored "again" in the second memory 107 to the first memory 105, and deletes the encoded data in the second memory 107 that is obtained by re-encoding (encoded data from the encoding unit 103 is not deleted). The encoding sequence control unit 110 reads out the value of the second counter 113, and adds it to the first counter 111. As a result, the first counter 111 indicates again the total amount of encoded data stored in the first memory.

Whether the re-encoding process has ended is detected by the second memory control unit 106. If no data to be read out for the re-encoding process is detected, the second memory control unit 106 notifies the encoding sequence control unit 110 of the end of the re-encoding process. In practice, the encoding process is completed after not only the read process from the second memory 107 but also the process of the re-encoding unit 112 end.

If the encoding sequence control unit 110 determines that the total encoded data amount has exceeded the target data amount again before input and encoding of a 1-page image are completed, the encoding sequence control unit 110 executes steps 1 to 5 above. Finally, the first memory 105 stores encoded data of the target data amount or less.

Figure 11:
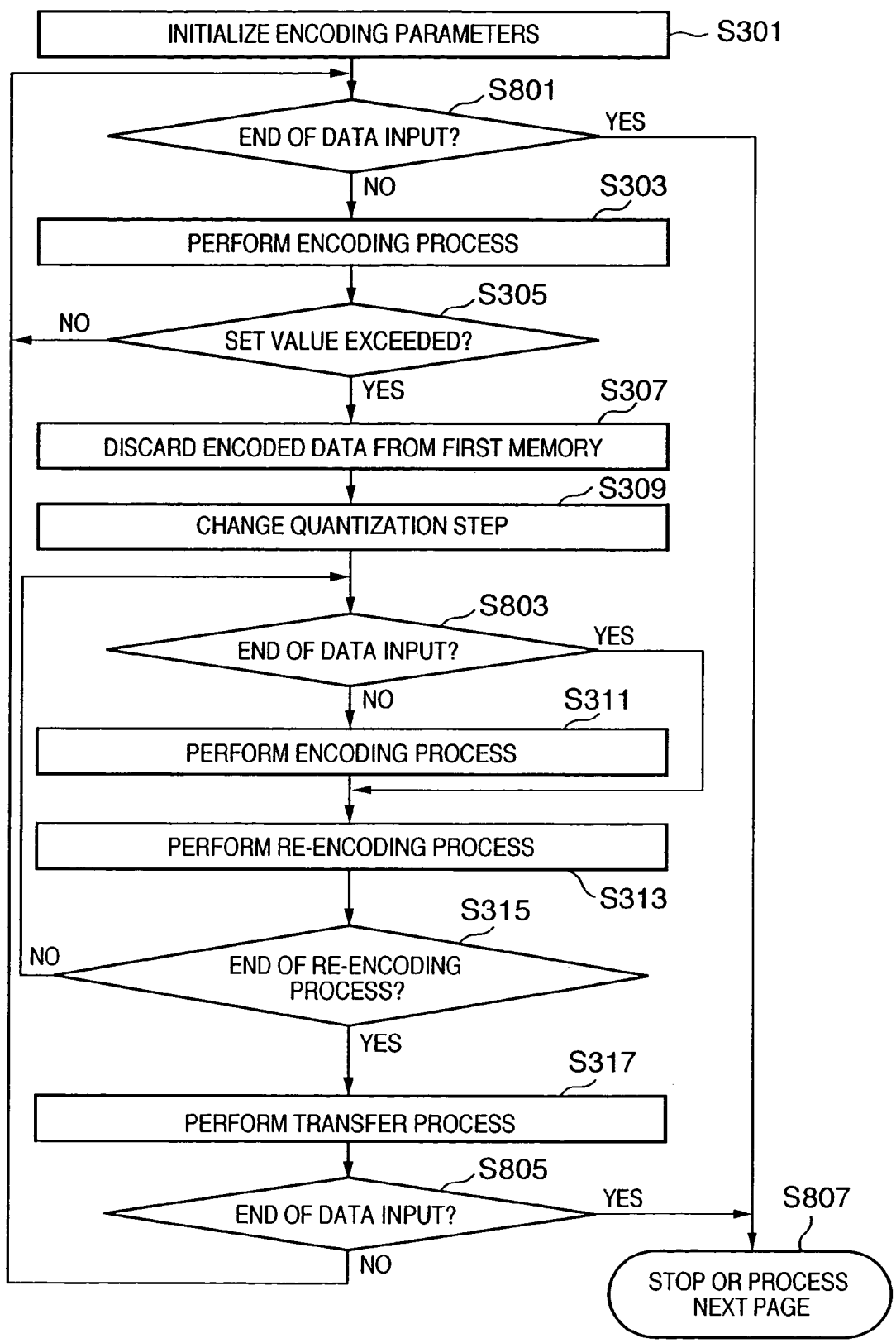
FIG. 11 is a flowchart showing details of the process according to the second embodiment.

The process sequence of the encoding sequence control unit 110 in the arrangement of FIG. 4 is shown in the flowchart of FIG. 11. For descriptive convenience, this process will be described first with reference to the simplified flowchart of FIG. 5.

Figure 5:
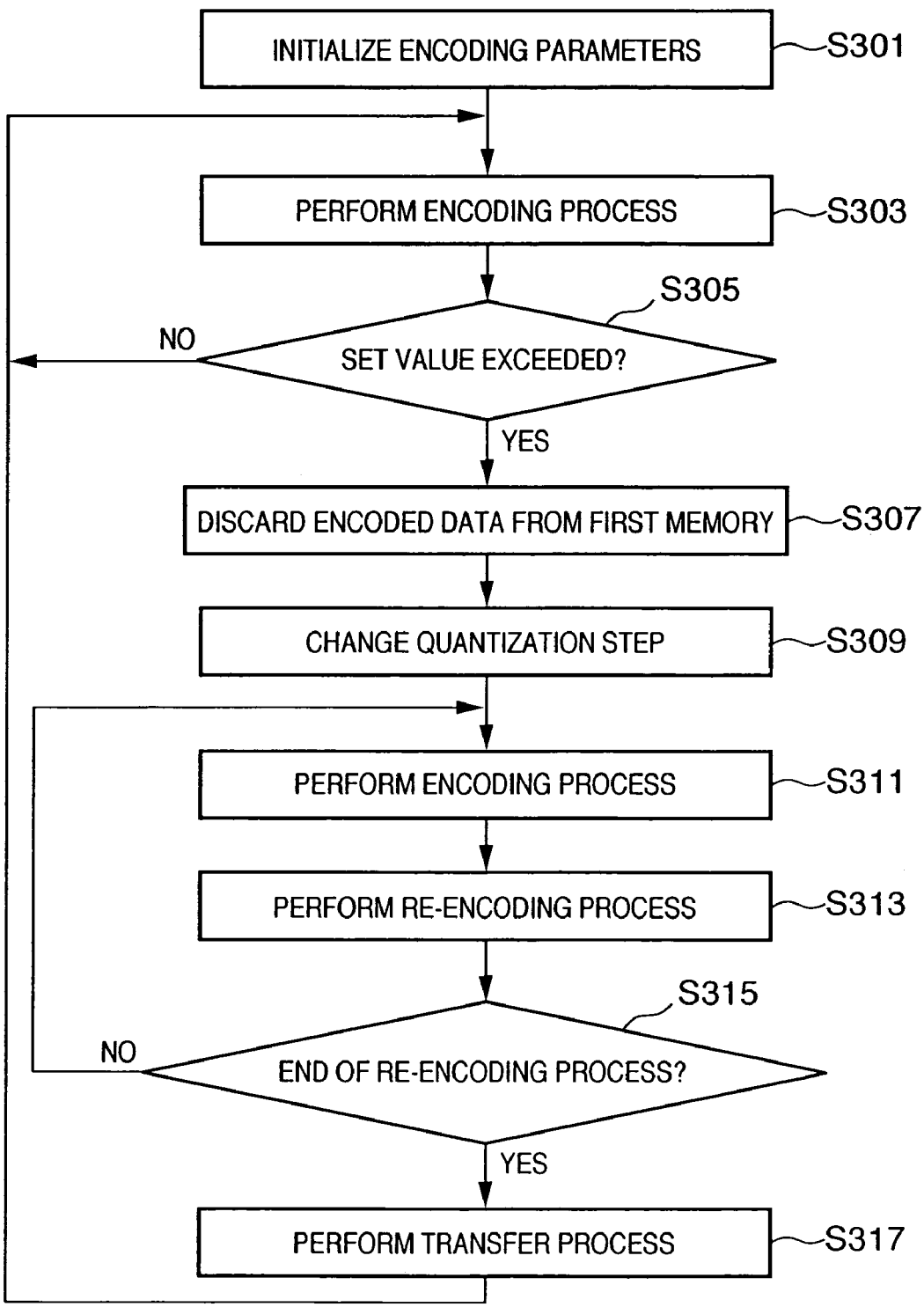
FIG. 5 is a flowchart showing a simplified flow of a process according to the second embodiment.

The flowchart of FIG. 5 is roughly divided into the following three process phases:

(1) an encoding phase,
(2) an encoding/re-encoding phase, and
(3) a transfer phase.

FIGS. 6 to 10 visually and simply show how image data, encoded data, and the like flow and are processed and how they are stored in the memories in the respective process phases.

Figure 6:
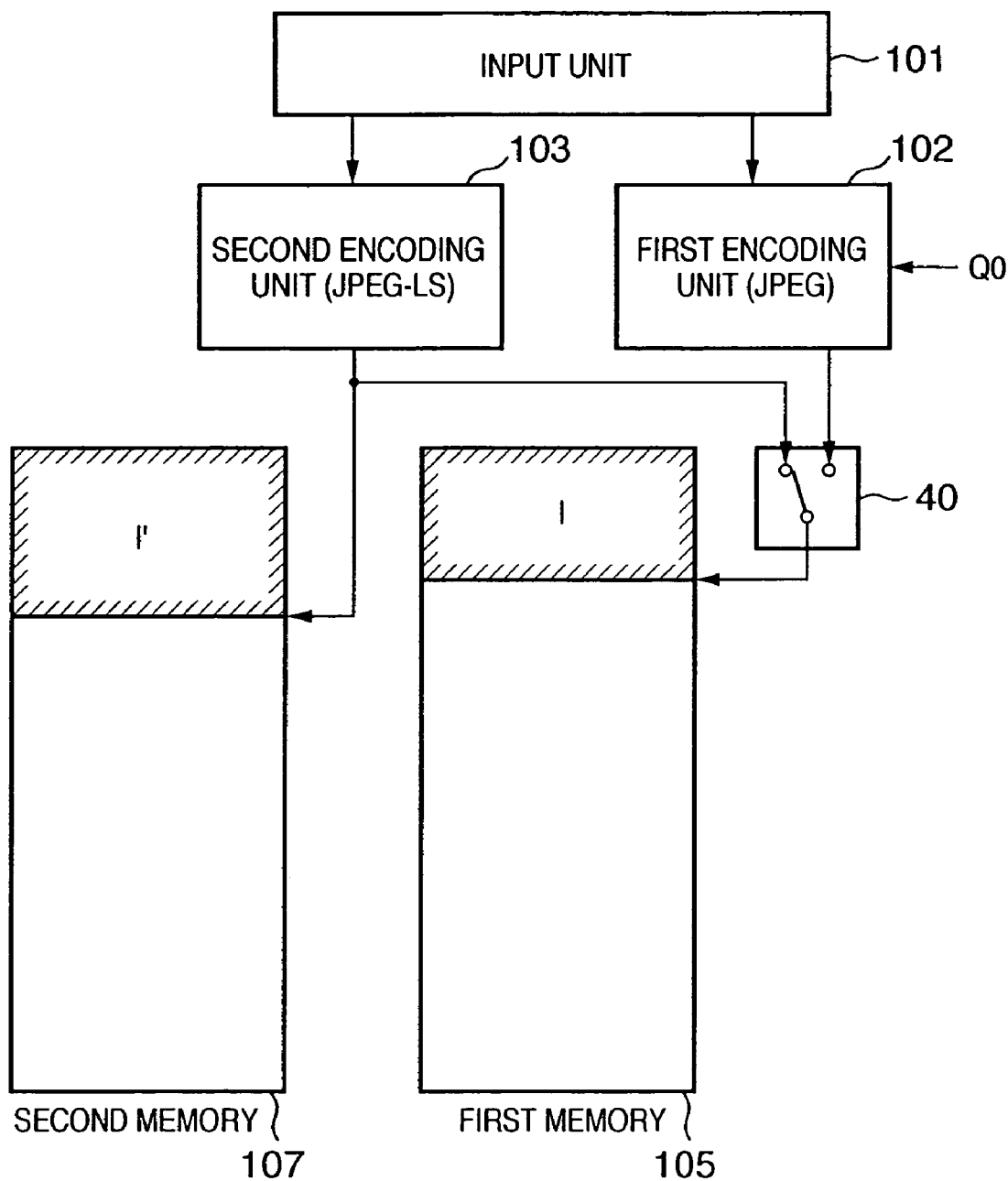
FIG. 6 is a view showing a data flow and memory contents in the encoding phase in an initial state according to the second embodiment.

FIG. 6 shows the initial state of the encoding phase corresponding to steps S303 and S305 in the flowchart of FIG. 5. Note that a switch 40 in FIG. 6 is implemented by the functions of the encoding sequence control unit 110 and first memory control unit 104. As a signal for switching, a signal from the LUT 120 shown in FIG. 2 is used.

The first memory 105 stores either one of data encoded by the two encoding units. This maintains a relation in which a data amount I in the first memory 105 is smaller than a data amount I' in the second memory 107.

Figure 7:
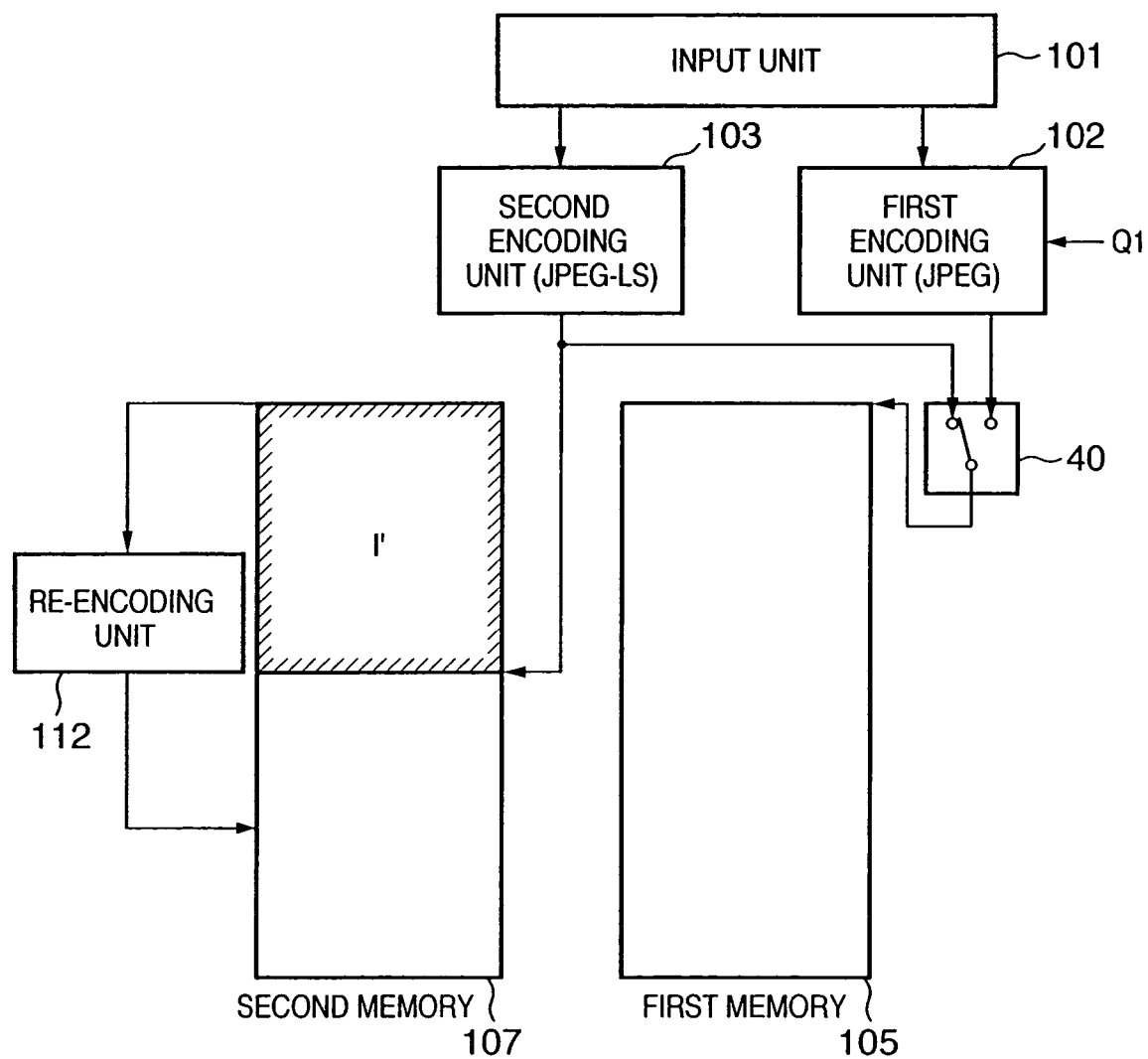
FIG. 7 is a view showing a data flow and memory contents at the start of the encoding/re-encoding phase according to the second embodiment.

FIG. 7 shows a state when the quantization matrix table is changed in step S309. As shown in FIG. 7, no encoded data is stored in the first memory 105.

Figure 8:
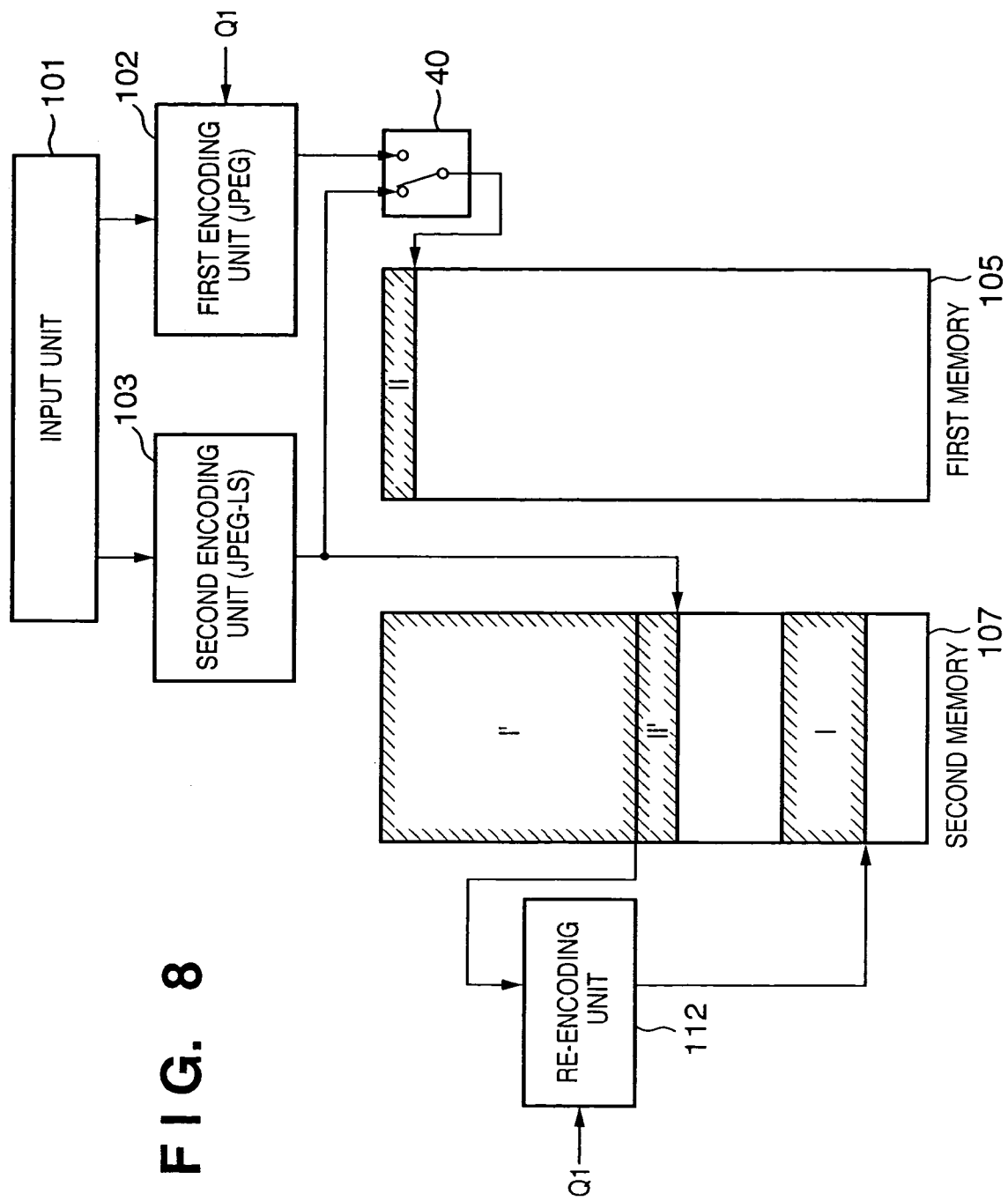
FIG. 8 is a view showing a data flow and memory contents at the end of the encoding/re-encoding phase according to the second embodiment.
Figure 9:
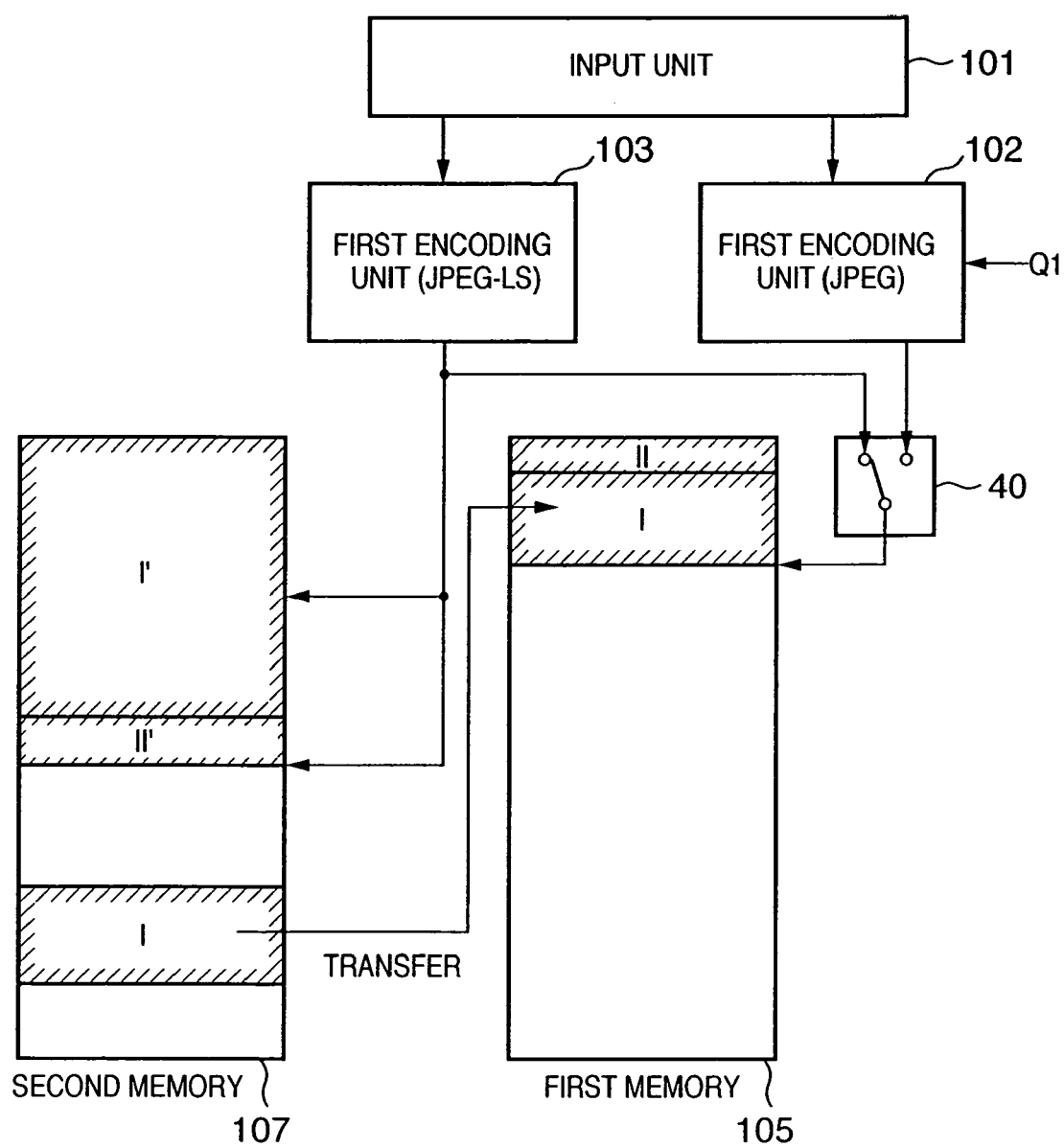
FIG. 9 is a view showing a data flow and memory contents in the transfer phase according to the second embodiment.
Figure 10:
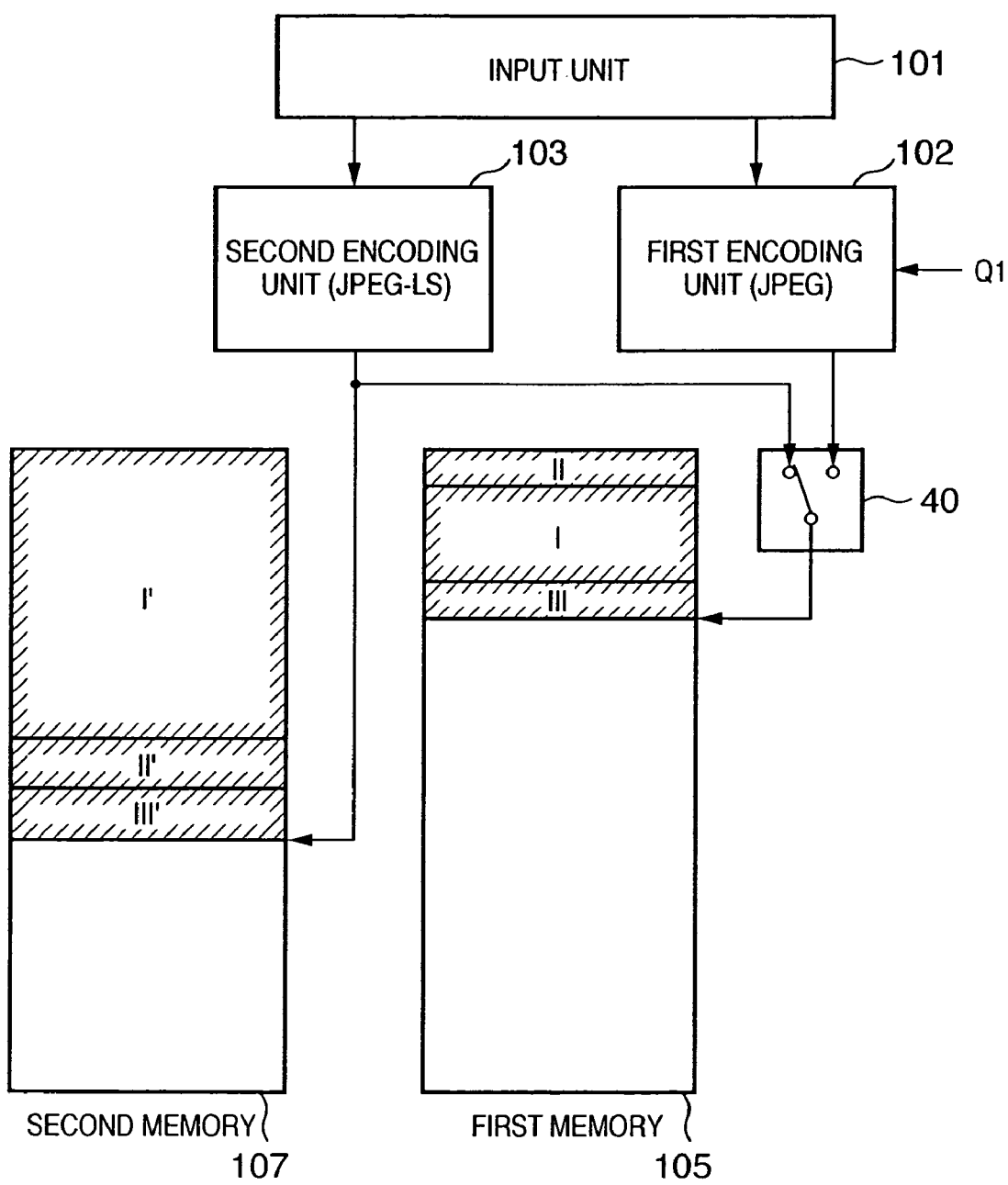
FIG. 10 is a view showing a data flow and memory contents in the encoding phase after the transfer phase according to the second embodiment.

FIG. 8 shows the process state of the encoding/re-encoding phase corresponding to steps S311 to S315. FIG. 9 shows the process state of the transfer phase corresponding to step S317. FIG. 10 shows the process state of the encoding phase after the transfer phase. Each phase will be described below.

<<Encoding Phase>>

An encoding process of 1-page image data starts from an encoding parameter initialization process (step S301). Step S301 is a process of setting the quantization matrix table Q0 to be applied to the first encoding unit 102, and a target data amount for an encoded data amount that is uniquely determined from an image size (paper size read by the input unit 101 for page description rendering or the like) subjected to an encoding process.

In step S303, an encoding process starts by the first and second encoding units 102 and 103. Consequently, the first memory 105 stores, for each pixel block, either one of encoded data from the first and second encoding units 102 and 103. The encoded data amount in the first memory 105 is counted by the first counter, as described above. The second memory 107 stores encoded data from the second encoding unit 103. FIG. 6 shows this state. The area I representing a data amount in the first memory 105 is at least equal to or narrower than the area I' representing a data amount in the second memory 107.

In step S305, it is checked whether the count value of the data amount has exceeded the target value. If NO in step S305, the first and second encoding processes in step S303 continue. This is the encoding phase in the initial state.

<<Encoding/Re-Encoding Phase>>

As the encoding process proceeds and the total code data amount in the first memory exceeds the target amount, encoded data in the first memory 105 is discarded in step S307. In step S309, the quantization matrix table Q0 set for the first encoding unit 102 is updated to the next quantization matrix table Q1. That the total encoded data amount exceeds a target data amount means that the data amount after compression does not fall within the target amount. Since it is useless to continue the encoding process by using the same quantization step, the quantization step is changed to the quantization step Q1 which is larger in quantization step width than the quantization step Q0.

After the quantization step is changed, the encoding process by the first and second encoding units 102 and 103 resumes in step S31.1. The quantization matrix table Q1 (identical to the updated quantization matrix table set for the first encoding unit) is set for the re-encoding unit 112. Re-encoding of the encoded data amount in the second memory starts, and the re-encoding result is stored again in the second memory. This state is shown in FIG. 7.

In step S315, the flow waits until the re-encoding process is completed.

<<Transfer Phase>>

FIG. 8 shows the storage state of encoded data in the first and second memories 105 and 107 when it is determined in step S315 that re-encoding is completed. In FIG. 8, areas II and II' represent encoded data corresponding to newly input image data during the re-encoding process. The area I represents the result (including both lossily and losslessly encoded data) of re-encoding encoded data stored in the area I'.

In step S317, as shown in FIG. 9, re-encoded data (area I in FIG. 9) stored in the second memory 107 is transferred to the first memory 105. Upon the completion of transfer, the data in the area I of the second memory 107 is discarded (or overwrite is permitted).

After the end of the transfer phase, the flow returns to the encoding phase in steps S303 and S305. As a result, as shown in FIG. 10, encoded data III and III' of newly input image data are stored in the respective memories. In this encoding phase, unlike the encoding phase in the initial state (FIG. 6), the quantization step used for encoding by the first encoding unit 102 is changed from Q0 to Q1, and the order of encoded data stored in the first memory 105 does not coincide with the image input order. Except these differences, the encoding phase immediately after the transfer phase and that in the initial state can be regarded to be identical. Since the order of encoded data is not always time series, as shown in FIG. 10, the storage address in each phase is separately stored. When an encoding process for one page is completed and the encoded data is to be output to the secondary storage device 7, the encoded data are read out and output in time series from the first memory 105.

By repeating the three, encoding, encoding/re-encoding, and transfer phases, codes obtained by compressing 1-page image data into a set data amount or less can be finally stored in the first memory 105. The input unit 101 only continues input operation until the end of a series of processes. That is, no image need be input again from the beginning.

The flowchart shown in FIG. 5 describes only processes corresponding to the respective phases shown in FIGS. 6 to 10 for easy understanding. In practice, however, input of 1-page image data comes to an end in some phase. Depending on the phase where the input operation comes to an end, the subsequent process slightly differs. The flowchart of FIG. 11 shows the flow of a process in consideration of this. The flowchart of FIG. 11 is based on the relationship between the completion of input of 1-page image data and each kind of process described with reference to FIG. 5. In this case, steps S801, S803, S805, and S807 are added to the flowchart of FIG. 5.

In steps S801, S803, and S805, it is checked whether input of 1-page image data from the input unit 101 is completed in the encoding phase, encoding/re-encoding phase, and transfer phase.

If it is detected that input of 1-page image data is completed in the encoding phase and transfer phase (steps S801 and S805), the flow advances to step S807 to terminate a compression encoding process for the page. If there is image data of one page or more to be compressed next, the compression encoding process for the next 1-page image data starts. If there is no data to be compressed, a halt condition is set.

If the end of input of 1-page image data is detected in the encoding/re-encoding phase (step. S803), the operation of the first and second encoding units 102 and 103 need be stopped until there is no image data to be re-encoded. For this reason, the encoding process in step S311 is passed, and only the re-encoding process is continued in step S313 to suppress, within a predetermined encoded data amount, image data which have already been encoded by the first and second encoding units 102 and 103. If the subsequent transfer process is not terminated after the re-encoding process is terminated for all data, the overall encoded data of 1-page image data is not collected in the first memory. The re-encoding process and subsequent transfer process must be continuously performed even after the end of input of 1-page image data. In this case, if it is detected in step S315 that the re-encoding process is terminated for all data, the encoded data stored in only the second memory 107 is transferred to the first memory during the encoding/re-encoding phase (step S317). Thereafter, the end of input of 1-page image data is detected in step S805, and the flow advances to step S807.

The above description has been made for operation in the second embodiment and is also a description of the operation in FIG. 11.

As has been described above, the second embodiment can attain the same effects as those of the first embodiment. Further, encoded data of a target encoded data amount or less can be generated without interrupting input of a 1-page image and inputting again it.

It should be noted that the embodiment uses the two techniques: lossy encoding "JPEG" and lossless encoding "JPEG-LS". As described above, JPEG encoding can obtain a high compression ratio for natural pictures. To the contrary, JPEG-LS encoding can obtain a high compression ratio for character/line images, and faithfully reconstruct an original image because of lossless encoding.

Figure 12:
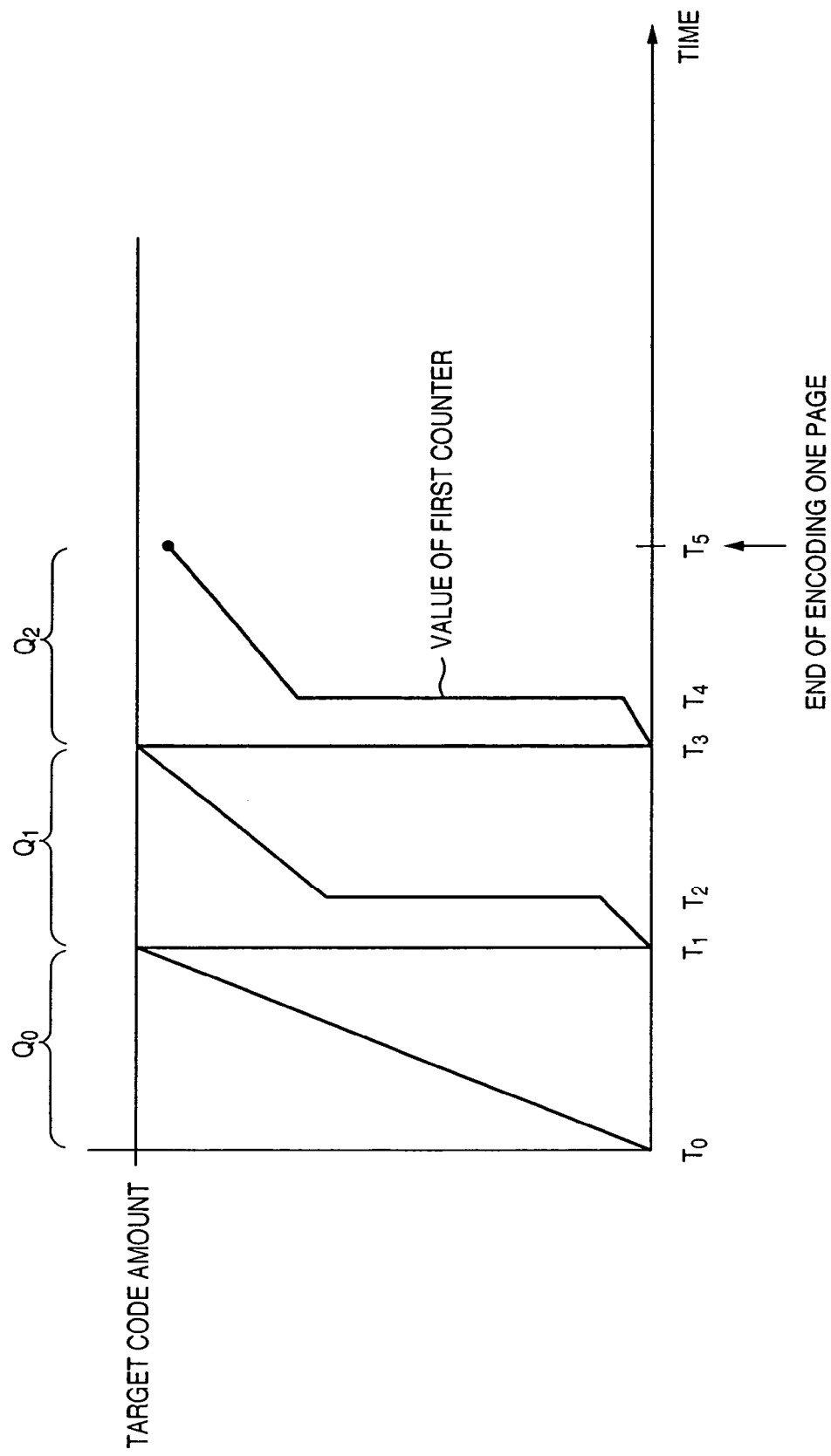
FIG. 12 is a timing chart showing an example of transition of the value of the first counter according to the second embodiment.

FIG. 12 shows an example of transition of the first counter 111 (code amount) along the time axis.

In FIG. 12, input of a document image starts at timing T0, and is completed at timing T5. Timing T5 is fixed as far as the size of an input document is fixed. A process at each timing will be explained.

Timing T0:

Timing T0 is an image input start (encoding start) timing. At this time, the quantization matrix table Q0 is set as an initial value for the first encoding unit 102, and the first counter 111 is initialized to "0". After that, as input and encoding of an image continue, the image data is encoded, and the count value of the first counter 111 gradually increases.

Timing T1:

At timing T1, the encoded data amount of image data reaches a target code amount. At this time, encoded data of image data in the first memory 105 is discarded, the first counter 111 is cleared to 0, and the quantization matrix table set for the first encoding unit 102 is updated to Q1. The quantization matrix table Q1 is also set for the re-encoding unit 112, and the re-encoding process starts.

Timing T2:

At timing T2, the re-encoding and transfer processes are completed. Upon the completion of re-encoding, re-encoded data is transferred from the second memory 107 to the first memory 105, and the value of the second counter 113 representing the re-encoded data amount is added to the first counter 111. Consequently, the first and second memories 105 and 107 store encoded data equivalent to data obtained such that image data input from the start of one page till timing T2 are encoded on the basis of the quantization matrix table Q1.

Timing T3:

At timing T3, the encoded data amount of image data reaches a target code amount again. At this time, encoded data of image data in the first memory 105 is discarded, the first counter 111 is cleared to 0, and the quantization matrix table of the first encoding unit 102 is changed to Q2. The quantization matrix table Q2 is also set for the re-encoding unit 112, and the re-encoding process starts.

Timing T4:

At timing T4, the re-encoding and transfer processes are completed. Upon the completion of re-encoding, re-encoded data is transferred from the second memory 107 to the first memory 105, and the value of the second counter 113 representing the re-encoded data amount is added to the first counter 111. As a result, the first and second memories 105 and 107 store encoded data equivalent to data obtained such that image data input from the start of one page till timing T2 are encoded on the basis of the quantization matrix table Q2.

Timing T5:

At timing T5, input of the 1-page document is completed. In this case, the first memory 105 stores encoded data of the 1-page image, and outputs the result to the secondary storage device 7.

To read the second document image, the process is repeated from timing T1.

Depending on an image, the value of the first counter 111 may exceed a target amount immediately before timing T5 at which input of a document image is completed. In this case, the re-encoding and transfer processes are done after timing T5. A condition that encoded data stored in the first memory 105 is output to the secondary storage device 7 is that input of a document image is completed and encoding (re-encoding and transfer) is also completed.

First Modification to Second Embodiment

FIG. 14 shows a modification of the arrangement in FIG. 4. The arrangement in FIG. 14 is different from that in FIG. 4 in that the storage destination of data re-encoded by the re-encoding unit 112 is changed to the first memory 105. The remaining arrangement is the same as that in FIG. 4.

Figure 15:
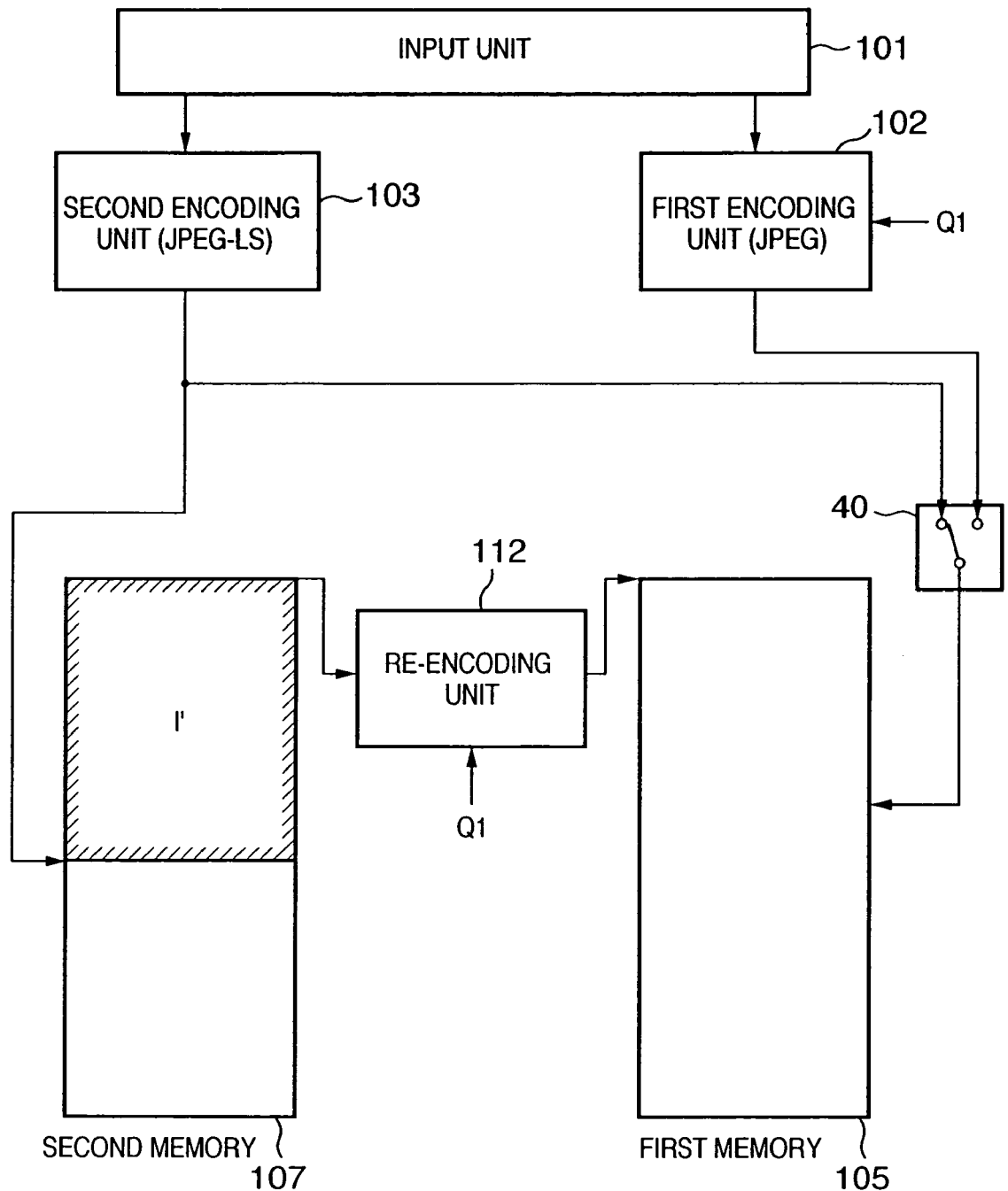
FIG. 15 is a view showing a data flow and memory contents at the start of the encoding/re-encoding phase in the arrangement of FIG. 14.

FIG. 15 shows a state in which the total encoded data amount in the first memory 105 exceeds a target data amount, data in the first memory 105 is discarded, and re-encoding of encoded data (area I' in FIG. 15) stored in the second memory 107 starts.

As shown in FIG. 15, the first memory 105 is set as the storage destination of re-encoding by the re-encoding unit 112, and re-encoding starts.

Figure 16:
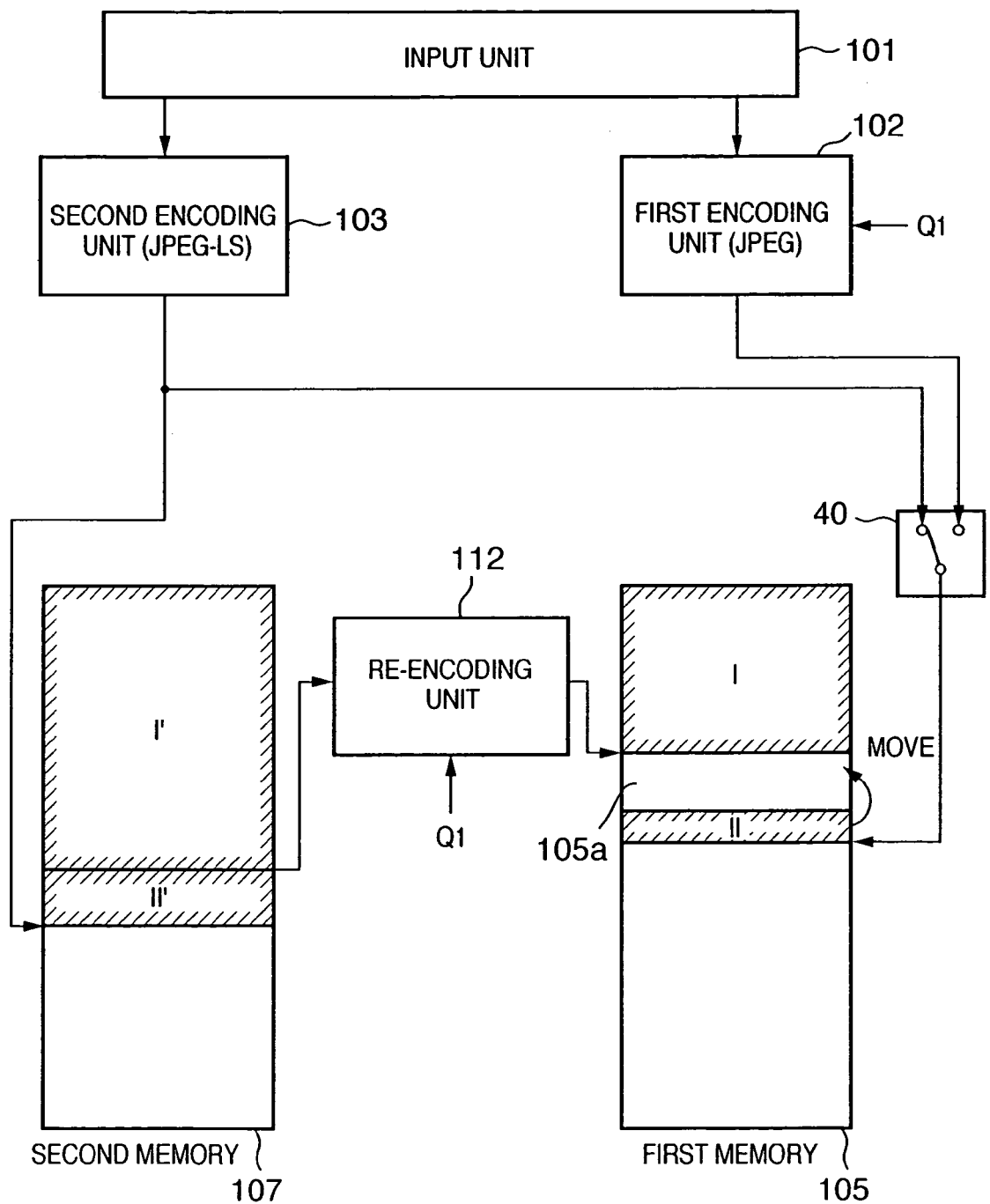
FIG. 16 is a view showing a data flow and memory contents at the start of the encoding/re-encoding phase in the arrangement of FIG. 14.

FIG. 16 shows the storage state of encoded data in two memories upon the completion of re-encoding. Upon the completion of re-encoding, as shown in FIG. 16, the first memory 105 stores encoded data represented in the area I. Encoded data in the area I corresponds to encoded data obtained when image data input before it is determined that the total data amount has exceeded a target data amount is encoded on the basis of the quantization matrix table Q1.

Since input and encoding of image data are performed even during re-encoding, the areas II and II' exist, as shown in FIG. 16.

Figure 17:
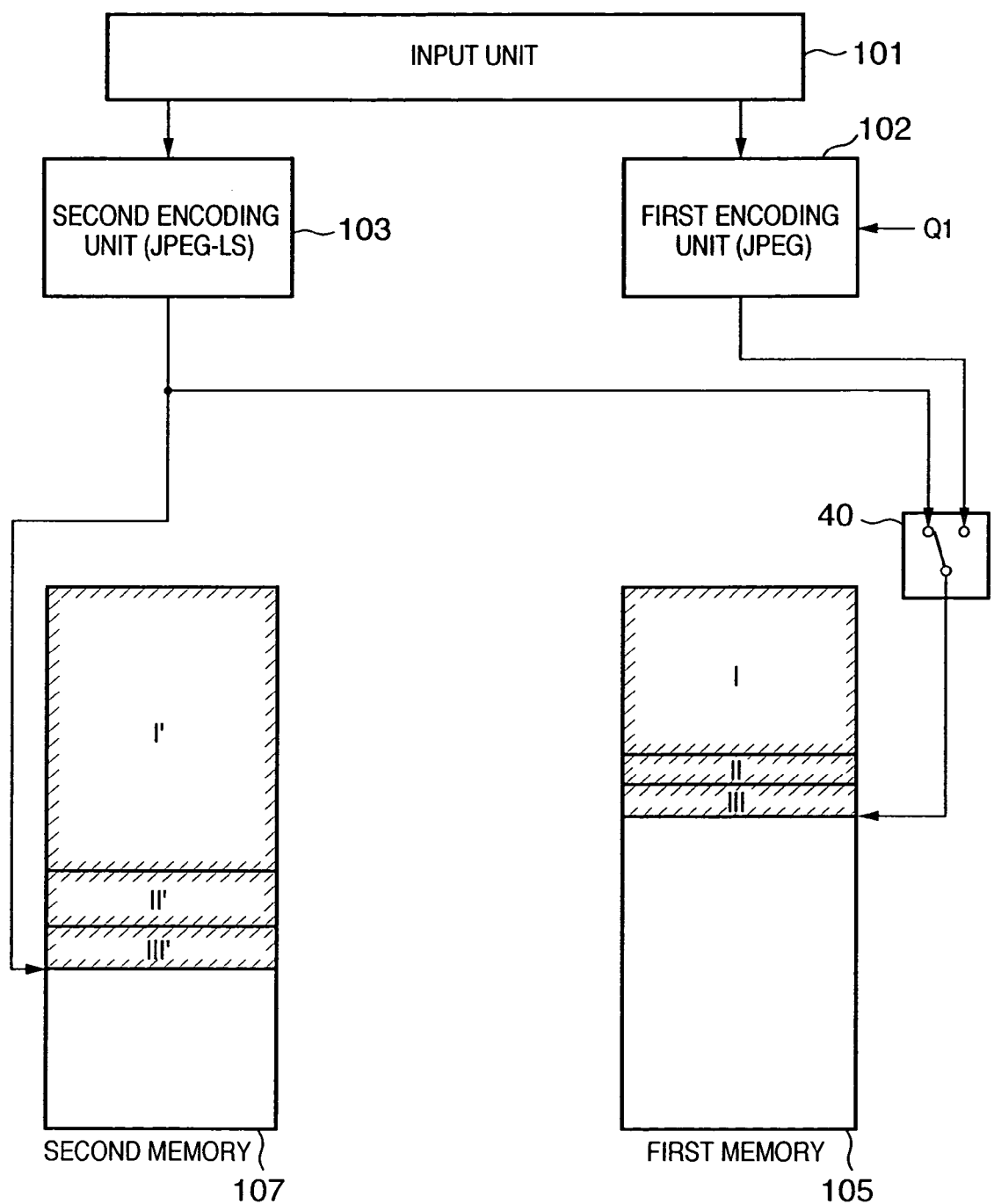
FIG. 17 is a view showing a data flow and memory contents in the transfer phase in the arrangement of FIG. 14.

Since a free area 105a is ensured in the first memory 105, encoded data in the area II shown in FIG. 16 is moved to the end position in the area I. Thereafter, the encoding phase resumes, and the storage state in the memory at this time is illustrated in FIG. 17.

The advantage of the arrangement in FIG. 14 over that in FIG. 4 is that data transfer after re-encoding is substantially omitted.

Since this modification omits only the transfer phase, the second embodiment and the modification are substantially the same in terms of repeating the three phases. Therefore, the contents of the process are almost the same as those in FIGS. 5 and 11, and a description thereof will be omitted. In FIG. 16, data is moved in the first memory 105 in order to eliminate the free area 105a, but internal transfer is not always necessary when a file management table for managing the connection relationship between areas, a packet management table, or the like is employed.

Second Modification to Second Embodiment

In the second embodiment and first modification, when the encoded data amount in the first memory 105 exceeds a target data amount, encoded data in the second memory 107 is re-encoded by the re-encoding unit 112. In other words, the re-encoding unit 112 does not execute re-encoding while the encoded data amount in the first memory 105 falls within the target data amount.

An example of effectively using this period will be explained as the second modification.

The following description is directed to a process while losslessly encoded data from the second encoding unit 103 is stored in the second memory 107 when the encoded data amount in the first memory 105 falls within the target data amount, under the condition that the quantization matrix table set for the first encoding unit 102 is Qi.

Similar to the second embodiment, losslessly encoded data from the second encoding unit 103 is stored in the second memory 107. However, the re-encoding unit 112 moves up a process of sequentially reading out stored losslessly encoded data, re-encoding it on the basis of the quantization matrix Qi+1 to generate lossily encoded data, and storing the result in the second memory 107.

Figure 13:
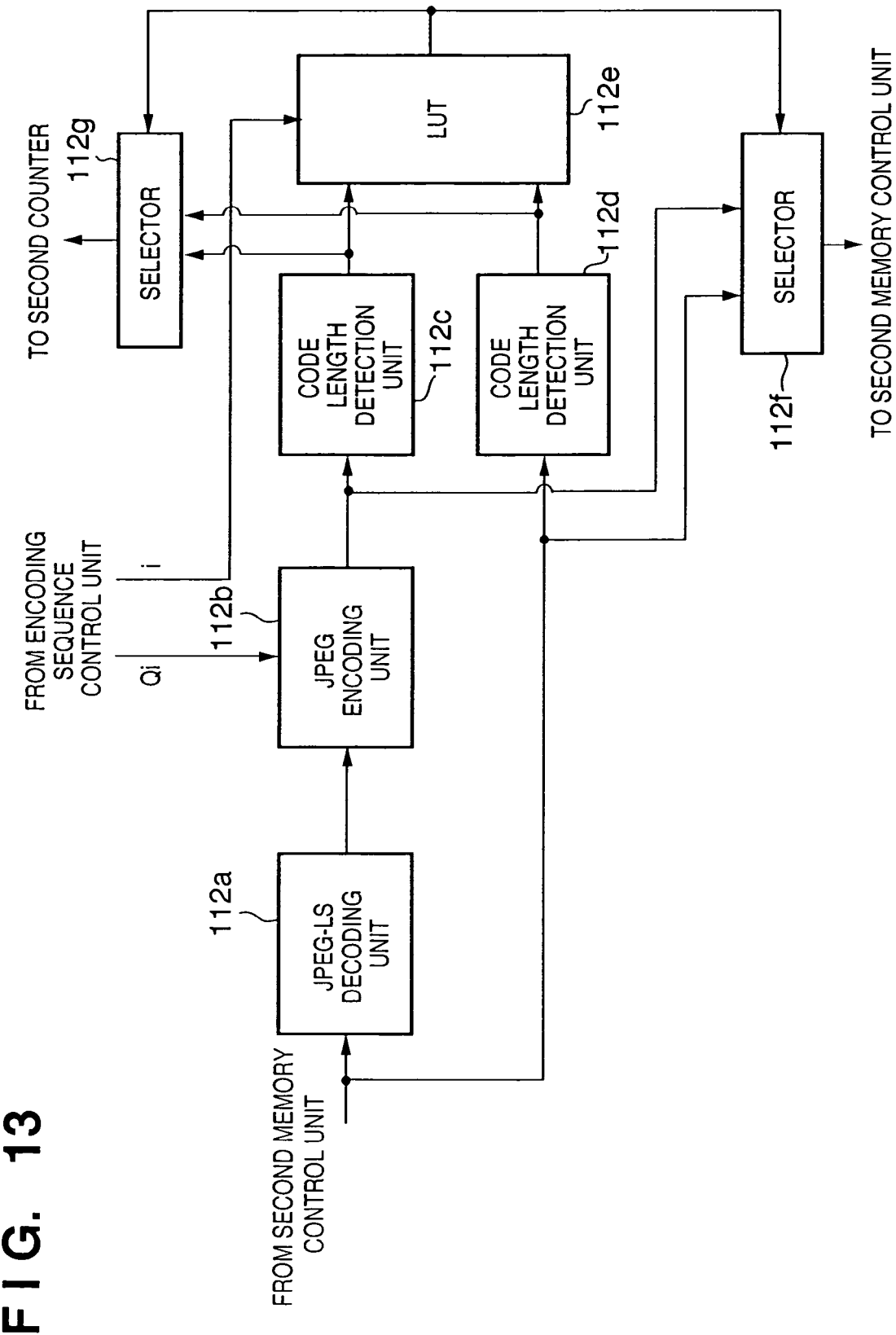
FIG. 13 is a block diagram showing a re-encoding unit according to the second embodiment.

Thus, it is promised that lossily encoded data exists to a certain degree in the second memory 107 in addition to losslessly encoded data when encoded data in the first memory 105 exceeds the target data amount. For the same pixel block position, encoded data having a smaller code length is transferred to the first memory. The process in FIG. 13 is performed for only a pixel block whose lossily encoded data to be compared does not exist.

Upon the completion of transfer from the second memory 107 to the first memory 105, lossily encoded data stored in the second memory is discarded, the quantization matrix Qi+2 is set this time, and re-encoding starts. Consequently, the process associated with re-encoding can be further shortened.

The first and second embodiments and the modifications to the second embodiment according to the present invention have been described. In the second embodiment, the first and second memories 105 and 107 are described as physically different memories. It is one of features of the present invention to independently arrange these memories. However, the present invention incorporates even a case wherein these memories are not physically different memories. Assume that two areas corresponding to the first and second memories are ensured in physically one memory when the transfer speed of a memory is high enough. In this case, it is obvious from the above description with the first and second memories being replaced with the first and second memory areas that the present invention can be realized by one memory.

If each embodiment described above is implemented by one memory, some steps in the data transfer process described with reference to the transfer phase become unnecessary. Details of each of such cases can be easily expected, and hence a description thereof will be omitted. When the two areas are strictly separated from each other and used, the data transfer process is required as in the case wherein physically two memories are used. If, however, identical data are shared between the two areas, the data transfer process can be omitted, and the storage capacity can also be reduced.

For example, in transferring encoded data held in the second memory area to the first memory area, two kinds of information on the start address at which the encoded data is stored and the data size of the encoded data are transferred from the second memory control unit to the first memory control unit, thereby obtaining the same effects as transferring the encoded data.

If the encoded data is stored in a file or packet form, the amount of information to be transferred between the memory control units slightly increases, and management table information associated with the encoded data must be transferred.

In the above embodiments, encoding is targeted to an 8×8 pixel block size, but this size does not limit the present invention. In short, two encoded data amounts generated for the same image area suffice to be compared using two (or more) different encoding techniques. For example, JPEG encoding can be done for each N×M pixel block, and JPEG-LS can be done for each 2N×2M pixel block. In this case, four JPEG-encoded data and one JPEG-LS encoded data may be compared.

In the above embodiments, lossy encoding "JPEG" and lossless encoding "JPEG-LS" are adopted as two encoding techniques. However, lossless and lossy encoding techniques are not limited to them.

However, the use of two encoding techniques which have different properties, like JPEG and JPEG-LS, in terms of whether the technique is lossless encoding or lossy encoding and is suited to character/line images or natural pictures acts advantageously to the present invention.

In the first and second embodiments, the non-linear boundary function f( ) has a curved portion as shown in FIGS. 18 and 19, but this does not limit the present invention. Because, the curved portion may be represented by a plurality of short straight lines.

In the first and second embodiments, the present invention is applied to the copying machine shown in FIG. 22. It is apparent that the present invention can also be applied to a case wherein an image input apparatus such as an image scanner is connected to a general-purpose information processing apparatus such as a personal computer to encode data. In this case, a program associated with the process shown in FIG. 3 or 5 (or FIG. 11) suffices to be executed, and the computer program apparently falls within the scope of the present invention. In general, the computer program can be executed by setting a computer-readable storage medium such as a CD-ROM in a computer, and copying or installing the computer program into the system. As a matter of course, the computer-readable storage medium also falls within the scope of the present invention.

As has been described above, according to the present invention, degradation of the image quality of a decoded image can be reduced while losslessly encoded data and lossily encoded data coexist.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-261565 filed Sep. 8, 2004, which is hereby incorporated by reference herein.

What is claimed is:

1. An image encoding apparatus that encodes image data for a pixel block, the apparatus comprising:

a first encoder that lossily encodes input image data for the pixel block to generate encoded data;

a second encoder that losslessly encodes the input image data for the pixel block to generate encoded data; and a computer that, letting Lx be a code length of encoded data of a pixel block of interest generated by said second encoder and Ly be a code length of encoded data of the pixel block generated by said first encoder, if Lx and Ly satisfy a predetermined non-linear boundary function f( ) such that $$Ly \geq f(Lx),$$

selects and outputs the encoded data generated by said second encoder as encoded data of the pixel block, and, if Lx and Ly do not satisfy the function f( ), selects and outputs the encoded data generated by said first encoder as the encoded data of the pixel block, wherein, when an X-Y coordinate space is defined in which the X axis represents the code length of a pixel block encoded by said second encoder and the Y axis represents the code length of the pixel block encoded by said first encoder, and in the X-Y coordinate space, an area in which encoded blocks of a predetermined text image are plotted is defined as the distribution area "T", an area in which encoded blocks of a predetermined computer-graphic image whose gradation is changed smoothly are plotted is defined as the distribution area "G", and an area in which encoded blocks of a predetermined natural image are plotted is defined as the distribution area "I", the predetermined non-linear boundary function f( ) has, in the X-Y coordinate space, a curve portion which extends from the origin point and passes between the distribution areas "G" and "I", and a linear portion which passes between the distribution areas "T" and "I".

2. The apparatus according to claim 1, wherein a predetermined code length is positioned near a maximum possible value of Lx when an image area, which has a gradation attribute and smoothly changes in density, is encoded by said second encoder.

3. The apparatus according to claim 1, wherein the non-linear boundary function f( ) is implemented using a look-up table memory that receives the code lengths Lx and Ly as addresses and stores data representing encoded data that is to be selected.

4. The apparatus according to claim 1, wherein said second encoder includes a JPEG-LS encoder and said first encoder includes a JPEG encoder for generating encoded data at a different compression ratio in accordance with a supplied quantization matrix table.

5. The apparatus according to claim 4, further comprising:
an initialization device that sets an initial matrix table Q0 for said first encoder at a start of encoding one page;
an first memory that stores encoded data output from said computer; and
a monitor that monitors an encoded data amount in said first memory;
wherein said computer, when said monitor determines that the encoded data amount becomes not less than a predetermined data amount, (a) discards the encoded data in said first memory, and (b) updates a parameter from a quantization matrix table Qi currently set for said first encoder to a quantization matrix table Qi+1.

6. The apparatus according to claim 5, wherein, after the quantization matrix table is updated, said computer inputs image data again and resumes encoding.

7. The apparatus according to claim 5, further comprising:
a second memory that stores data losslessly encoded by said second encoder; and
a re-encoder that decodes the encoded data in said second memory, re-encodes the decoded data in accordance with a supplied parameter to generate lossily encoded data, selects one of the encoded data after re-encoding and the losslessly encoded data before re-encoding in accordance with the non-linear boundary function f( ), and stores the selected encoded data in said first memory,
wherein, when said monitor determines that an encoded data amount in said first memory becomes not less than a predetermined data amount, said computer (c) sets a parameter Qi for said re-encoder to cause said re-encoder to generate encoded data before the encoded data amount becomes not less than the predetermined data amount.

8. A method for controlling an image encoding computer that encodes image data for a pixel block, the method comprising:
a first encoding step of lossily encoding input image data for the pixel block to generate encoded data;
a second encoding step of losslessly encoding input image data for the pixel block to generate encoded data; and
a selection step of, letting Lx be a code length of encoded data of the pixel block generated in the second encoding step and Ly be a code length of encoded data of the pixel block generated in the first encoding step, when Lx and Ly satisfy a predetermined non-linear boundary function f( ):

$Ly \geq (Lx)$, selecting and outputting, by the image encoding computer, the encoded data generated in the second encoding step, and, when Lx and Ly do not satisfy the function f( ), selecting and outputting, by the image encoding computer, the encoded data generated in the first encoding step,
wherein, when an X-Y coordinate space is defined in which the X axis represents the code length of a pixel block encoded in said second encoding step and the Y axis represents the code length of the pixel block encoded in said first encoding step, and
in the X-Y coordinate space, an area in which encoded blocks of a predetermined text image are plotted is defined as the distribution area "T", an area in which encoded blocks of a predetermined computer-graphic image whose gradation is changed smoothly are plotted is defined as the distribution area "G", and an area in which encoded blocks of a predetermined natural image are plotted is defined as the distribution area "I",
the predetermined non-linear boundary function f( ) has, in the X-Y coordinate space, a curve portion which extends from the origin point and passes between the distribution areas "G"and "I", and a linear portion which passes between the distribution areas "T" and "I".

9. A computer-readable storage medium having stored thereon a computer program that, when read and executed by a computer, causes the computer to function as an image encoding apparatus for encoding image data for a pixel block, wherein said computer program causes the computer to execute:
a first encoding step of lossily encoding input image data for the pixel block to generate encoded data;
a second encoding step of losslessly encoding input image data for the pixel block to generate encoded data; and
a selection step of, letting Lx be a code length of encoded data of the pixel block generated in said second encoding step and Ly be a code length of encoded data of the pixel block generated in said first encoding step, when Lx and Ly satisfy a predetermined non-linear boundary function f( )

$Ly \geq f(Lx)$, selecting and outputting the encoded data generated in said second encoding step, and, when Lx and Ly do not satisfy the function f( ), selecting and outputting the encoded data generated in said first encoding step,
wherein, when an X-Y coordinate space is defined in which the X axis represents the code length of a pixel block encoded in said second encoding step and the Y axis represents the code length of the pixel block encoded in said first encoding step, and in the X-Y coordinate space, an area in which encoded blocks of a predetermined text image are plotted is defined as the distribution area "T", an area in which encoded blocks of a predetermined computer-graphic image whose gradation is changed smoothly are plotted is defined as the distribution area "G", and an area in which encoded blocks of a predetermined natural image are plotted is defined as the distribution area "I", the predetermined non-linear boundary function f( ) has, in the X-Y coordinate space, a curve portion which extends from the origin point and passes between the distribution areas "G" and "I", and a linear portion which passes between the distribution areas "T" and "I".

\* \* \* \* \*